(12) United States Patent
Cheng et al.

(10) Patent No.: US 10,313,683 B2
(45) Date of Patent: Jun. 4, 2019

(54) VIDEO ENCODER WITH CONTEXT SWITCHING

(71) Applicant: Apple Inc., Cupertino, CA (US)

(72) Inventors: Joseph J. Cheng, Palo Alto, CA (US); Timothy J. Millet, Mountain View, CA (US); Shun Wai Go, Cupertino, CA (US); Guy Cote, San Jose, CA (US)

(73) Assignee: Apple Inc., Cupertino, CA (US)

( * ) Notice: Subject to any disclaimer, the term of this patent is extended or adjusted under 35 U.S.C. 154(b) by 42 days.

(21) Appl. No.: 14/474,114

(22) Filed: Aug. 30, 2014

(65) Prior Publication Data

US 2016/0065969 A1 Mar. 3, 2016

(51) Int. Cl.
H04N 19/172 (2014.01)
H04N 19/176 (2014.01)
(Continued)

(52) U.S. Cl.
CPC ........... *H04N 19/176* (2014.11); *G06F 9/461* (2013.01); *G06F 9/4818* (2013.01);
(Continued)

(58) Field of Classification Search
CPC .................................................. H04N 19/176
(Continued)

(56) References Cited

U.S. PATENT DOCUMENTS 7,852,854 B2 12/2010 Monta et al.
2005/0147173 A1 7/2005 Winger et al.
(Continued)

FOREIGN PATENT DOCUMENTS

| EP | 1545133 | 6/2005 |
| TW | 200931818 | 7/2009 |
| WO | 03/104989 | 12/2003 |

OTHER PUBLICATIONS

International Search Report and Written Opinion from PCT/US2015/047058, Apple Inc., dated Nov. 11, 2015, pp. 1-15.
(Continued)

*Primary Examiner* — Christopher S Kelley
*Assistant Examiner* — Asmamaw G Tarko
(74) *Attorney, Agent, or Firm* — Robert C. Kowert; Meyertons, Hood, Kivlin, Kowert & Goetzel, P.C.

(57) ABSTRACT

A context switching method for video encoders that enables higher priority video streams to interrupt lower priority video streams. A high priority frame may be received for processing while another frame is being processed. The pipeline may be signaled to perform a context stop for the current frame. The pipeline stops processing the current frame at an appropriate place, and propagates the stop through the stages of the pipeline and to a transcoder through DMA. The stopping location is recorded. The video encoder may then process the higher-priority frame. When done, a context restart is performed and the pipeline resumes processing the lower-priority frame beginning at the recorded location. The transcoder may process data for the interrupted frame while the higher-priority frame is being processed in the pipeline, and similarly the pipeline may begin processing the lower-priority frame after the context restart while the transcoder completes processing the higher-priority frame.

16 Claims, 22 Drawing Sheets

(51) Int. Cl.
*H04N 19/46* (2014.01)
*G06F 9/46* (2006.01)
*G06F 9/48* (2006.01)
*H04N 19/129* (2014.01)
*H04N 19/127* (2014.01)
*H04N 19/174* (2014.01)
*H04N 19/42* (2014.01)
*H04N 19/40* (2014.01)
*H04N 19/182* (2014.01)

(52) U.S. Cl.
CPC ......... *H04N 19/127* (2014.11); *H04N 19/129* (2014.11); *H04N 19/172* (2014.11); *H04N 19/174* (2014.11); *H04N 19/182* (2014.11); *H04N 19/40* (2014.11); *H04N 19/42* (2014.11); *H04N 19/46* (2014.11)

(58) Field of Classification Search
USPC ........................................................ 375/240
See application file for complete search history.

(56) References Cited

U.S. PATENT DOCUMENTS

| | | | | |
|---|---|---|---|---|
| 2009/0196356 | A1* | 8/2009 | Houki | H04N 21/23424 375/240.25 |
| 2010/0296574 | A1* | 11/2010 | Gordon | H04N 5/4401 375/240.01 |
| 2011/0096699 | A1 | 4/2011 | Sakhamuri et al. | |
| 2012/0179833 | A1 | 7/2012 | Kenrick et al. | |
| 2013/0215020 | A1* | 8/2013 | Matsuda | G06F 3/03 345/157 |
| 2013/0223538 | A1 | 8/2013 | Wang et al. | |
| 2013/0308927 | A1 | 11/2013 | Demas et al. | |
| 2014/0198652 | A1 | 7/2014 | Dalal et al. | |
| 2015/0085931 | A1* | 3/2015 | Cote | H04N 19/439 375/240.16 |
| 2015/0092833 | A1* | 4/2015 | Ku | H04N 19/176 375/240.02 |
| 2015/0092834 | A1* | 4/2015 | Cote | H04N 19/129 375/240.02 |
| 2015/0092843 | A1* | 4/2015 | Millet | H04N 19/423 375/240.12 |
| 2015/0092854 | A1* | 4/2015 | Orr | H04N 19/51 375/240.16 |
| 2016/0134881 | A1* | 5/2016 | Wang | H04N 19/436 375/240.02 |

OTHER PUBLICATIONS

U.S. Appl. No. 14/037,316, filed Sep. 25, 2013, Craig M. Okruhlica.
U.S. Appl. No. 14/039,820, filed Sep. 27, 2013, Guy Cote.
U.S. Appl. No. 14/039,764, filed Sep. 27, 2013, Timothy John Millet.
U.S. Appl. No. 14/037,313, filed Sep. 25, 2013, Joseph J. Cheng.
U.S. Appl. No. 14/039,729, filed Sep. 27, 2013, James E. Orr.
U.S. Appl. No. 14/037,310, filed Sep. 25, 2013, Guy Cote.
U.S. Appl. No. 14/039,880, filed Sep. 27, 2013, Weichun Ku.
U.S. Appl. No. 14/039,900, filed Sep. 27, 2013, Guy Cote.
Office Action from Taiwan Patent Application No. 104128531, dated Jul. 15, 2016 (English Translation and Taiwan Version), Apple Inc., pp. 1-6.

* cited by examiner

VIDEO ENCODER WITH CONTEXT SWITCHING

BACKGROUND

Technical Field

This disclosure relates generally to video or image processing, and more specifically to methods and apparatus for processing digital video frames in block processing pipelines.

Description of the Related Art

Various devices including but not limited to personal computer systems, desktop computer systems, laptop and notebook computers, tablet or pad devices, digital cameras, digital video recorders, and mobile phones or smart phones may include software and/or hardware that my implement a video processing method. For example, a device may include an apparatus (e.g., an integrated circuit (IC), such as a system-on-a-chip (SOC), or a subsystem of an IC), that may receive and process digital video input from one or more sources and output the processed video frames according to one or more video processing methods. As another example, a software program may be implemented on a device that may receive and process digital video input from one or more sources and output the processed video frames according to one or more video processing methods. As an example, a video encoder 10 as shown in FIG. 1 represents an apparatus, or alternatively a software program, in which digital video input (input frames 90) is encoded or converted into another format (output frames 92), for example a compressed video format such as H.264/Advanced Video Coding (AVC) format (also referred to as MPEG 4 Part 10), or H.265 High Efficiency Video Encoding (HEVC) format according to a video encoding method. An apparatus or software program such as a video encoder 10 may include multiple functional components or units, as well as external interfaces to, for example, video input sources and external memory.

In some video processing methods, to perform the processing, each input video frame 90 is divided into rows and columns of blocks of pixels (e.g., 16×16 pixel blocks), for example as illustrated in FIG. 2 which shows an example 192×192 pixel frame divided into 144 16×16 pixel blocks. Each block of an input video frame 90 is processed separately, and when done the processed blocks are combined to form the output video frame 92. This may be referred to as a block processing method. Conventionally, the blocks are processed by the block processing method in scan order as shown in FIG. 2, beginning at the first block of the first row of the frame (shown as block 0), sequentially processing the blocks across the row, and continuing at the first block of the next row when a row is complete.

A block processing method may include multiple processing steps or operations that are applied sequentially to each block in a video frame. To implement such a block processing method, an apparatus or software program such as a video encoder 10 may include or implement a block processing pipeline 40. A block processing pipeline 40 may include two or more stages, with each stage implementing one or more of the steps or operations of the block processing method. FIG. 1 shows an example video encoder 10 that implements an example block processing pipeline 40 that includes at least stages 42A through 42C. A block is input to a stage 42A of the pipeline 40, processed according to the operation(s) implemented by the stage 42A, and results are output to the next stage 42B (or as final output by the last stage 42). The next stage 42B processes the block, while a next block is input to the previous stage 42A for processing. Thus, blocks move down the pipeline from stage to stage, with each stage processing one block at a time and multiple stages concurrently processing different blocks. Conventionally, the blocks are input to and processed by the block processing pipeline 40 in scan order as shown in FIG. 2. For example, in FIG. 1, the first block of the first row of the frame shown in FIG. 2 (block 0) is at stage 42C, the second block (block 1) is at stage 42B, and the third block (block 2) is at stage 42A. The next block to be input to the block processing pipeline 40 will be the fourth block in the first row.

H.264/Advanced Video Coding (AVC)

H.264/AVC (formally referred to as ITU-T Recommendation H.264, and also referred to as MPEG-4 Part 10) is a block-oriented motion-compensation-based codec standard developed by the ITU-T (International Telecommunications Union-Telecommunication Standardization Sector) Video Coding Experts Group (VCEG) together with the ISO/IEC JTC1 Moving Picture Experts Group (MPEG). The H.264/AVC standard is published by ITU-T in a document titled "ITU-T Recommendation H.264: Advanced video coding for generic audiovisual services". This document may also be referred to as the H.264 Recommendation.

SUMMARY OF EMBODIMENTS

Embodiments of methods and apparatus are described in which multiple video streams may be simultaneously processed by a video encoder that implements a block processing pipeline. A context switching method for video encoders is described that enables higher priority video streams to interrupt lower priority video streams being processed by the video encoder. A video frame from a higher priority source may be received for processing by the video encoder while a video frame from a lower priority source is being processed by the pipeline. The pipeline may be signaled to perform a context stop for the current frame. In response, the pipeline stops processing the current frame at an appropriate place (e.g., at the end of a row group). The context stop may be propagated through the stages of the pipeline so that all stages terminate the context correctly, and to a transcoder engine through a DMA stream so that the transcoder knows that a context stop has occurred. The stopping location is recorded. In some embodiments, a buffer including a last row of processed blocks may be saved. The pipeline may then process the higher-priority frame. When the pipeline finishes processing the higher-priority frame, a context restart is performed and the pipeline resumes processing the lower-priority frame beginning at the recorded location part way through the frame. In some embodiments, the last row of processed blocks for the lower-priority frame that were saved for the context stop may be restored to be used as "above" neighbors at one or more stages of the pipeline. The transcoder engine may continue to process the stream read from DMA for the interrupted frame while the higher-priority frame is being processed in the pipeline, and similarly the pipeline may begin processing the interrupted frame while the transcoder completes processing the higher-priority frame.

BRIEF DESCRIPTION OF THE DRAWINGS

FIGS. 7A through 7E graphically illustrate reordering blocks on row group boundaries between contexts, according to at least some embodiments.

Figure 1:
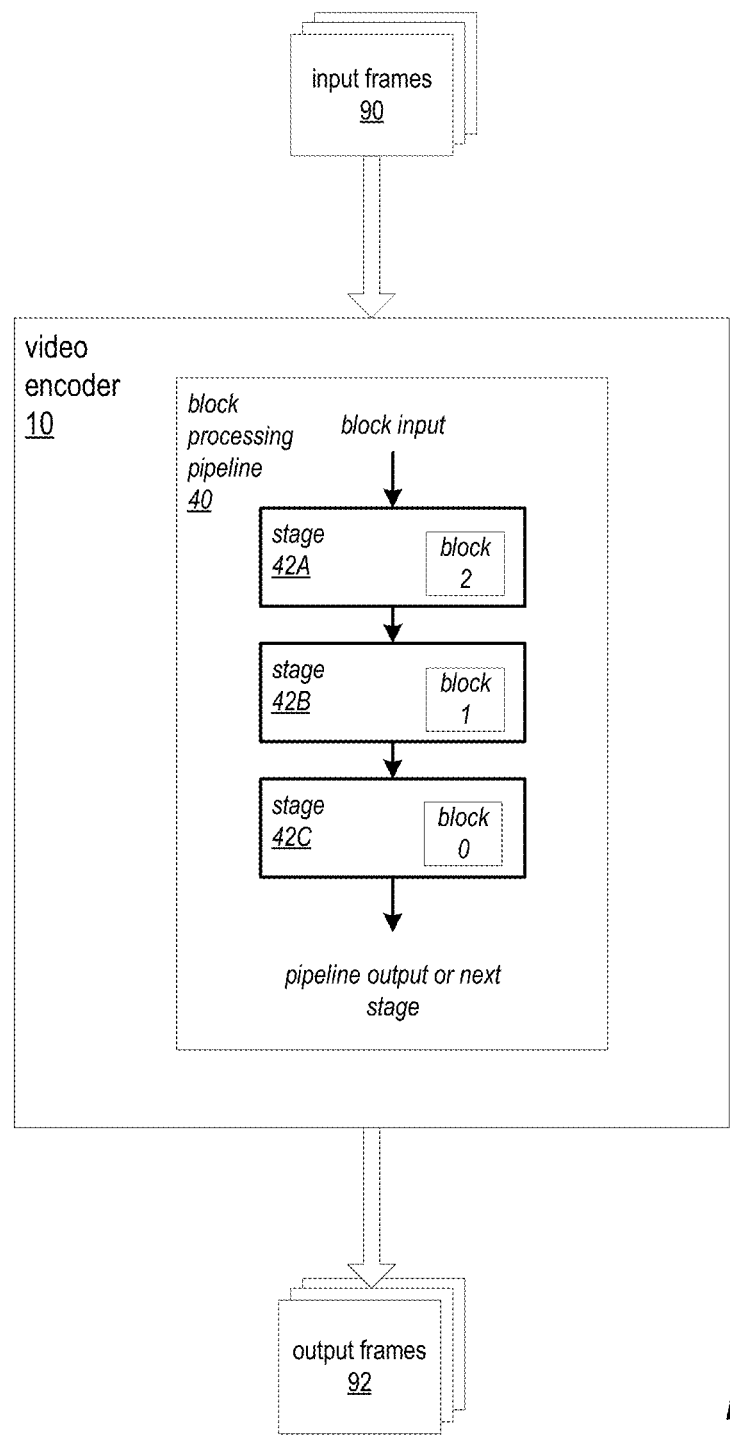
FIG. 1 illustrates an example video encoder including a conventional block processing pipeline that processes blocks from input frames in scan order.
Figure 2:
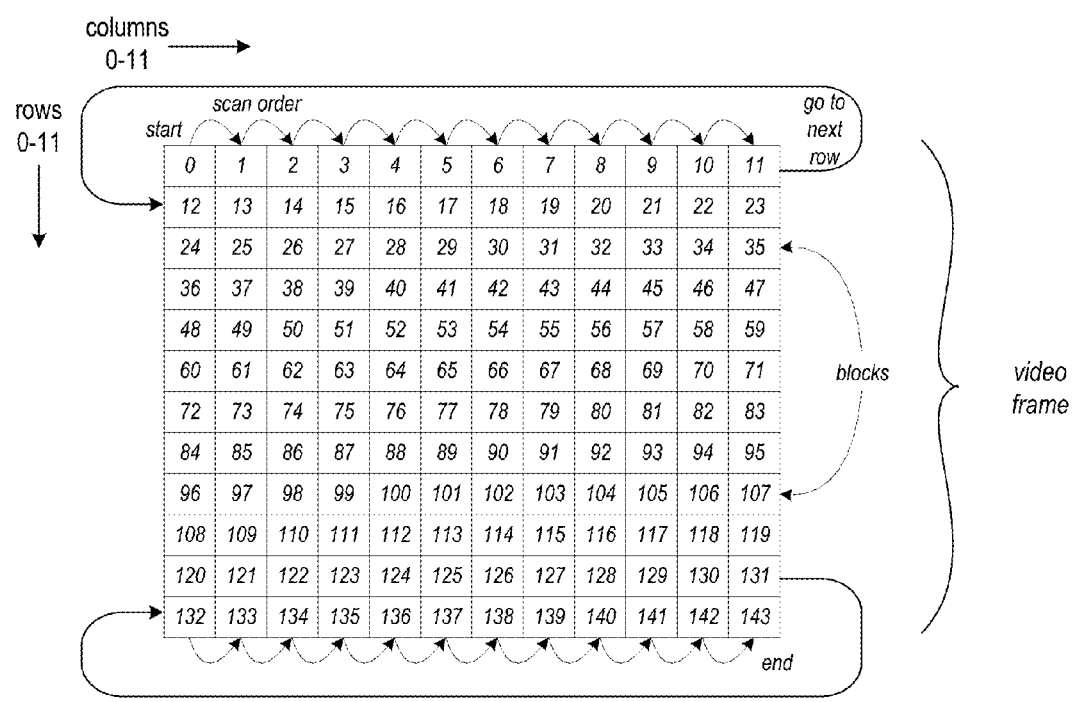
FIG. 2 illustrates conventional scan order processing of blocks from a video frame.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) interpretation for that unit/circuit/component.

DETAILED DESCRIPTION

Figure 12:
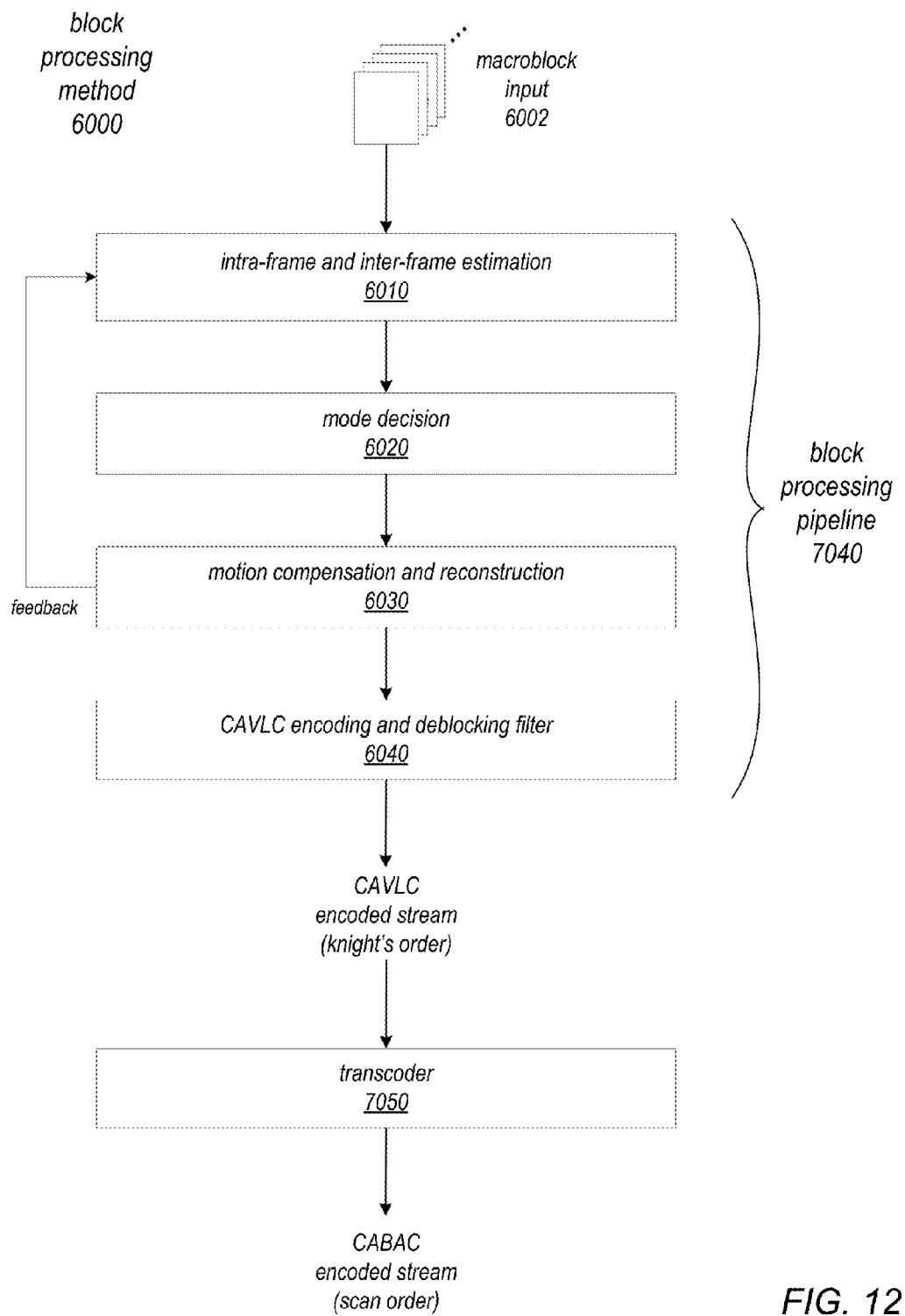
FIG. 12 is a high-level block diagram of general operations in an example block processing method that may be implemented by a block processing pipeline that implements one or more of the block processing methods and apparatus described herein, according to at least some embodiments.
Figure 13:
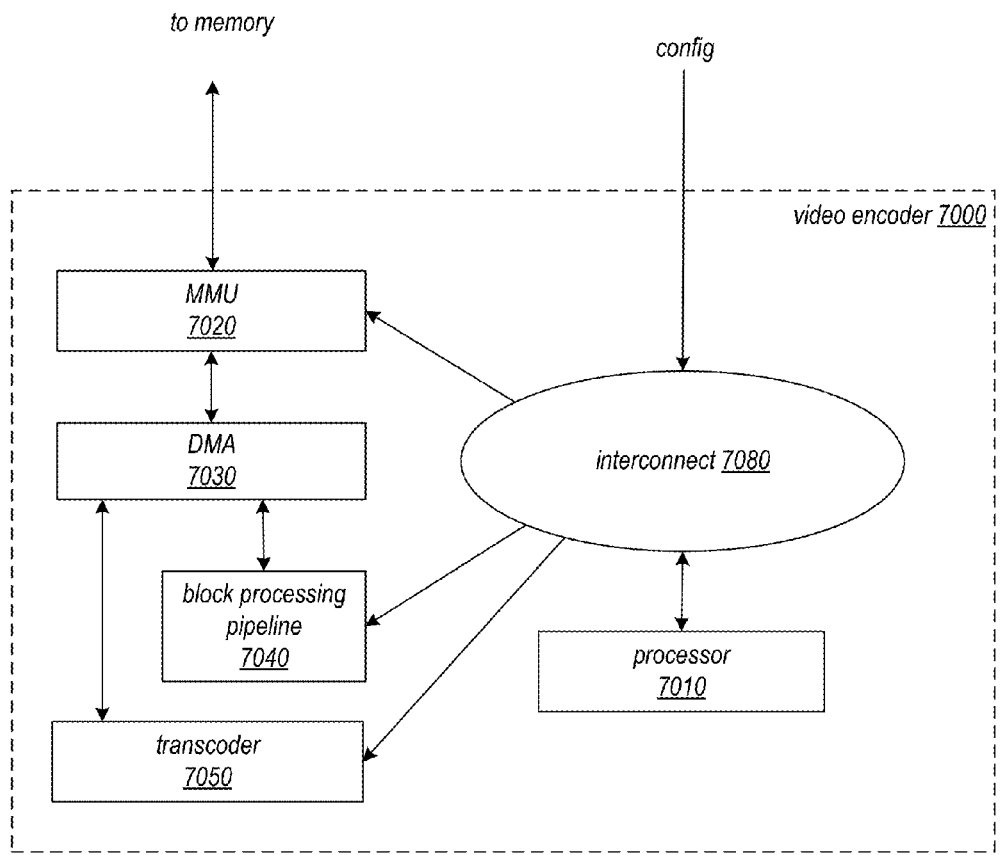
FIG. 13 is a block diagram of an example video encoder apparatus, according to at least some embodiments.

Various embodiments of methods and apparatus for processing digital video frames in block processing pipelines are described. Embodiments of block processing methods and apparatus are generally described herein in the context of video processing in which input video frames are subdivided into and processed according to blocks of elements (e.g., 16×16, 32×32, or 64×64 pixel blocks). Embodiments of an example H.264 video encoder that includes a block processing pipeline and that may implement one or more of the block processing methods and apparatus are described herein. The H.264 video encoder converts input video frames from an input format into H.264/Advanced Video Coding (AVC) format as described in the H.264/AVC standard (the H.264 Recommendation). FIG. 12 illustrates an example block processing pipeline of an example H.264 video encoder, and FIG. 13 illustrates an example H.264 video encoder that includes a block processing pipeline. However, embodiments of the block processing methods and apparatus may be used in encoders for other video encoding formats, for example in block processing pipelines of HEVC (High Efficiency Video Encoding) video encoders that convert input video frames from an input format into HEVC format as described in the HEVC standard. The HEVC standard is published by ITU-T in a document titled "ITU-T Recommendation H.265: High Efficiency Video Encoding". Other video encoders that may use embodiments of the block processing methods and apparatus may include, but are not limited to, H.263, MPEG-2, MPEG-4, and JPEG-2000 video encoders. However, it is to be noted that embodiments of the block processing methods and apparatus may be used in any block processing pipeline, including but not limited to block processing pipelines implemented in various other video encoders and/or decoders (which may be referred to as codecs) in which digital video frames input in one format are encoded or converted into another format. Further note that the block processing methods and apparatus may be used in software and/or hardware implementations of video encoders. In addition to video encoders/decoders, the block processing methods and apparatus described herein may be used in various other applications in which blocks from a video frame or still digital image are processed, for example in pipelines that process still digital images in various image processing applications. Thus, it is to be understood that the term frame or video frame as used herein may also be taken to refer to any digital image.

Embodiments of the block processing methods and apparatus as described herein may be implemented in two or more parallel block processing pipelines. For example, 2, 4, 8, or more pipelines may be configured to run in parallel, with each pipeline processing a quadrow from an input video frame, for example with blocks input according to knight's order.

Embodiments of the block processing methods and apparatus are generally described herein in the context of video processing in which input frames are subdivided into and processed according to blocks of picture elements (referred to as pixels, or pels), specifically 16×16 pixel blocks referred to as macroblocks that are used, for example, in H.264 encoding. However, embodiments may be applied in pipelines in which blocks of other sizes and geometries, or of other elements, are processed. For example, HEVC encoding uses blocks referred to as Coding Tree Units (CTUs) that may vary within the range of 16×16 pixel to 64×64 pixel. In some implementations such as H.264 encoders, the blocks input to the pipeline may be referred to as macroblocks, each macroblock including two or more blocks or partitions that may be processed separately at stages of the pipeline. For example, for input video frames encoded in YUV (e.g., YUV420 format) or YCbCr (e.g., YCbCr 4:2:0, 4:2:2 or 4:4:4 formats) color space, a macroblock may be composed of separate blocks of chroma and luma elements that may be processed separately at stages in a pipeline. In addition to applications that process frames in a pipeline according to blocks of elements (e.g., blocks of pixels), the block processing methods and apparatus may be applied in applications in which digital images (e.g., video frames or still images) are processed by single elements (e.g., single pixels).

Video Encoder with Context Switching

Figure 14:
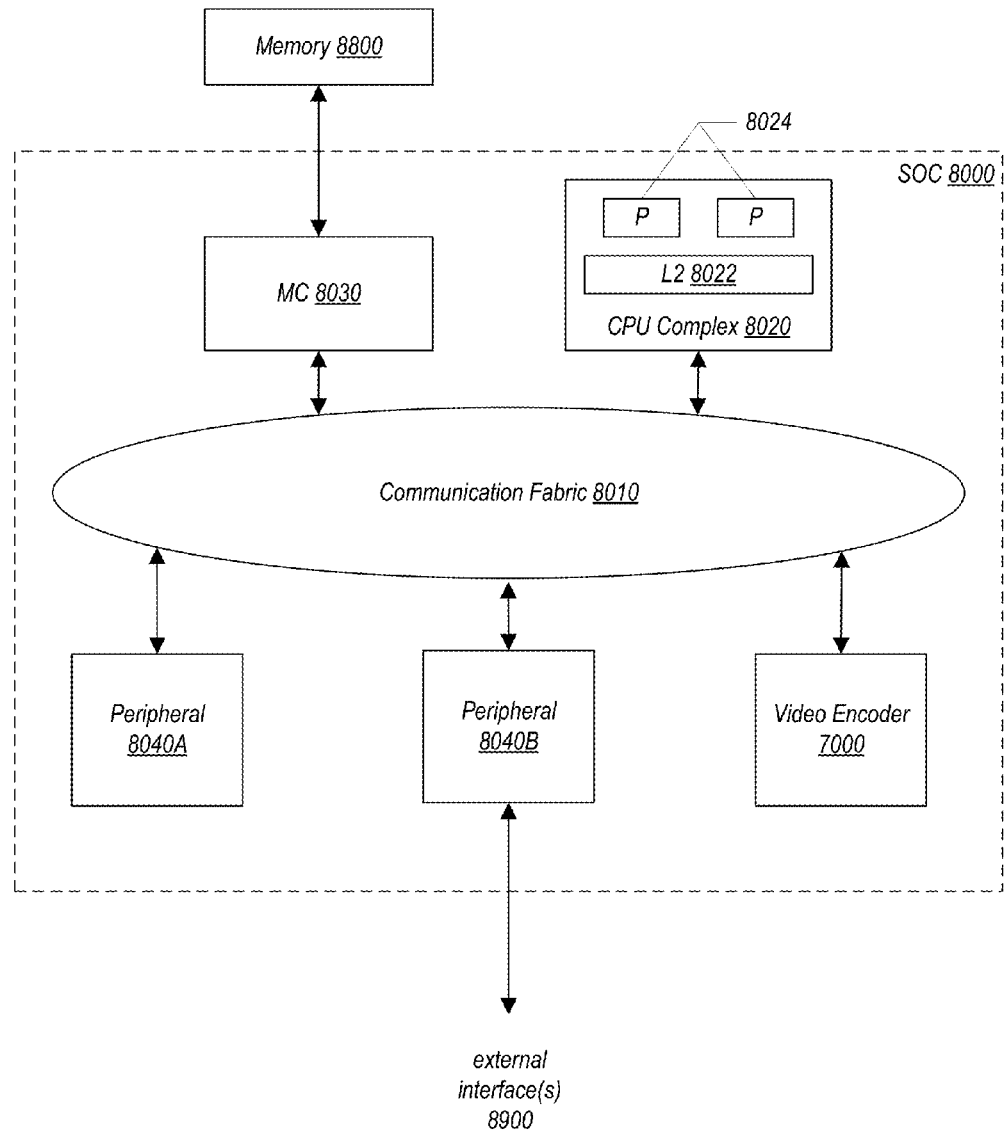
FIG. 14 is a block diagram of one embodiment of a system on a chip (SOC).

Embodiments of methods and apparatus are described in which multiple video streams may be simultaneously processed by a video encoder that implements a block processing pipeline. A context switching method is described that enables higher priority video streams to interrupt lower priority video streams being processed by the video encoder. Using the context switching method, the video encoder may stop pipeline processing of a lower priority stream in the middle of a frame, process a frame from the higher priority stream through the pipeline, and then restart pipeline processing of the lower priority frame. Referring to FIGS. 13 and 14, a video encoder 7000 that implements a block processing pipeline 7040 may receive video streams from two or more video sources for processing, for example video streams from an image signal processor (ISP) and from a display controller. In some situations, two or more of these video streams may overlap. For example, a display controller may be processing a wireless video stream for display while an ISP is receiving and processing video captured by a camera on the device. Thus, the video encoder 7000 may in some cases be processing a video frame from one video source when a video frame from another video source is ready to be processed. Some video sources, such as video being received by the device over a wireless connection for display, may be higher priority than other video sources, such as video being captured, processed, and stored via an on-device camera and ISP. These higher-priority video sources may be referred to as low latency video sources, as video frames from these sources generally need to be processed as soon as possible, for example to maintain video display rates and quality. However, in conventional video encoders, upon receiving a video frame from a low latency video source for processing, the video encoder completes processing of a current frame before beginning processing of the low latency frame even if the current frame being processed is from a lower priority video source.

Embodiments of a video encoder are described in which the encoder may be directed to encode a higher priority, low latency frame during processing of a current frame. In response, the video encoder may direct the block processing pipeline to stop and restart processing within the current frame to allow for encoding of the low latency frame. In these embodiments, when a low latency frame needs to be processed, the video encoder can suspend processing within the current frame to service the low latency frame, and can then resume processing within the current frame where it suspended processing. Starting processing of a frame in the block processing pipeline may be referred to as a context start. Stopping pipeline processing at a location within a frame may be referred to as a context stop. Resuming pipeline processing at a location within a frame may be referred to as a context restart. The process of ending one context in the pipeline and beginning another context may be referred to as a context switch. For example, a context switch is performed when stopping processing of the current frame to process the low latency frame, and another context switch is performed when resuming processing of the current frame after processing the low latency frame.

An example video encoder apparatus 7000 is illustrated in FIG. 13. An example system on a chip (SOC) 8000 that includes a video encoder apparatus 7000 is illustrated in FIG. 14. An example block processing method 6000 and block processing pipeline 7040 that may be implemented by the video encoder apparatus 7000 are illustrated in FIG. 12. Example pipeline units that may be used at the stages of a block processing pipeline 7040 are illustrated in FIGS. 11A through 11C. As illustrated in FIGS. 8 through 10B, in some embodiments, a video encoder apparatus 7000 may be configured to process blocks of pixels from an input frame according to a knight's order processing method, and may be configured to process the blocks according to row groups (e.g., in row groups each containing four rows of blocks, referred to as quadrows).

Figure 3:
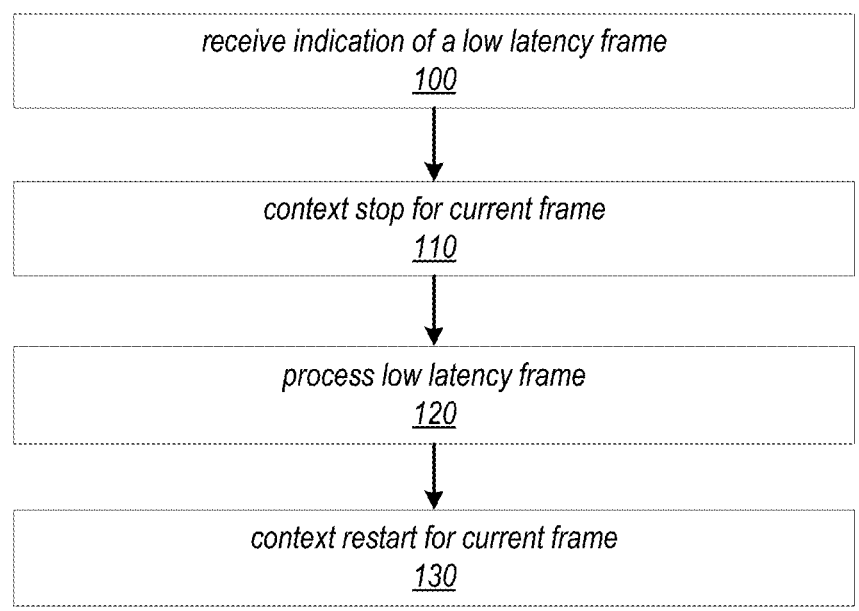
FIG. 3 is a high-level flowchart of a method for performing a context stop and restart within a frame to process a low-latency frame in a video encoder, according to at least some embodiments.

FIG. 3 is a high-level flowchart of a method for performing a context stop and restart within a frame to process a higher priority, low-latency frame in a video encoder, according to at least some embodiments. As indicated at 100 of FIG. 3, the video encoder may receive an indication that a low latency frame needs to be processed while a current frame from a lower priority video source is being processed in the block processing pipeline of the video encoder. For example, referring to FIG. 14, in some embodiments a peripheral 8040 such as a display controller or ISP that has high priority video to process may signal the video encoder 7000 (e.g., via an interrupt) that a high priority frame needs to be processed.

As indicated at 110 of FIG. 3, in response to receiving the indication of a high priority frame that needs to be processed, the video encoder may perform a context stop for the current frame. To perform the context stop, the video encoder may direct the block processing pipeline to stop processing the current frame. In at least some embodiments, the block processing pipeline may only stop processing within a frame at certain locations. For example, in some embodiments, the video encoder may be configured to process blocks of pixels from an input frame according to row groups (e.g., in row groups each containing four rows of blocks, referred to as quadrows), and the pipeline may be configured to stop processing for a context only at the end of a row group. In some embodiments, the video encoder may direct the block processing pipeline to stop processing the current frame at a specified location, for example at the end of a specified row group. Alternatively, in some embodiments, the video encoder may direct the block processing pipeline to stop processing the current frame at a next available location as determined by the pipeline, for example at the end of a current row group. In either case, the location in the current frame at which the context stop is performed may be recorded. This location is the offset into the frame at which a next context for the current frame will begin after processing the low latency frame.

In some embodiments, the block processing pipeline may be configured to only perform a context stop when there would be sufficient rows left in the current frame to process as a separate context. For example, a threshold of N rows for a context may be specified, and the block processing pipeline may only execute a context stop for a current frame when requested if at least N rows would be left to process as a separate context in the frame.

As indicated at 120 of FIG. 3, after performing the context stop for the current frame, the low latency frame may be processed by the video encoder. In at least some embodiments, the pipeline completes processing of the blocks from the current context, and signals the video encoder that the context stop has been completed. In at least some embodiments, after the block processing pipeline completes processing of the blocks from the current context, the video encoder may configure the block processing pipeline for processing the low latency frame, and the pipeline then begins reading and processing blocks from the low latency frame.

As indicated at 130 of FIG. 3, after the block processing pipeline completes processing of the low latency frame, the video encoder performs a context restart for the current frame. In at least some embodiments, the video encoder may configure the block processing pipeline for processing the current frame beginning at the recorded location at which the context stop was performed. The pipeline then begins reading and processing blocks from the recorded location in the current frame (e.g., at the beginning of a next row group) as the next context.

In at least some embodiments, the context stop of the current frame and the pipeline configuration to process the low latency frame flushes content in memories of the pipeline related to the current frame, for example cached luma and chroma reference data from previously processed frames in the video stream that may be used in motion estimation, motion compensation, and reconstruction, block data buffered at the pipeline stages (e.g., in memories 5010 as illustrated in FIGS. 11A and 11B), and so on. When the context restart is performed, the pipeline starts fresh with the next context, as if it was beginning processing of a new frame, but beginning at the offset indicated by the context stop location.

However, in some embodiments, at least some data from the previous context for the current frame may be persisted and used for the next context. For example, one or more operations performed at stages of a block processing pipeline may depend on one or more of the neighbor blocks from the previous (or above) row of blocks such as the top neighbor, top-left neighbor, top-right neighbor, and top-right-right neighbor blocks, as shown in FIG. 3. In some embodiments, when processing a row group, information for each block on the bottom row of the row group is written to a neighbor data structure in an external memory, for example by a last stage of the pipeline. In some embodiments, this neighbor data structure is persisted at a context stop. At the context restart, when processing blocks from the top row of the first row group in the new context, information for neighbor blocks in the bottom row of the previous context is read from the external memory, for example by a first stage of the pipeline, and passed down the pipeline to other stages with the top row blocks.

In some embodiments, for example as shown in FIGS. 12 through 14, a video encoder 7000 may implement a block processing method 6000 in which a block processing pipeline 7040 outputs processed macroblocks from a current frame to frame buffer(s) in an external memory (e.g., via DMA 7030 as shown in FIG. 13). A transcoder 7050 reads data from the frame buffer(s) via DMA 7030, performs a transcoding operation on the data, and outputs the transcoded data. For example, the transcoder 7050 may perform a memory-to-memory transcoding or conversion of a CAVLC (context-adaptive variable-length coding) encoded stream output by the pipeline 7040 to a CABAC (context-adaptive binary arithmetic coding) encoded stream. In these embodiments, a context stop may be indicated to the transcoder 7050 through DMA 7030, for example by inserting a marker with an indication of the end of the context in the data stream. In some embodiments, since the transcoder 7050 is buffered from the pipeline 7040 by frame buffer(s) in the external memory, the pipeline 7040 may begin processing a next context while the transcoder 7050 is still processing the buffered data from the previous context by using different frame buffer(s) for the two contexts. In other words, pipeline 7040 and transcoder 7050 processing may overlap between contexts.

In some embodiments, the CABAC context of the transcoder 7050 may be reset between contexts. For example, in some embodiments, the transcoder 7050 may be configured to reset the CABAC context at slice boundaries. When configuring the pipeline 7040 for a next context, the video encoder may insert a slice header (e.g., slice headers as defined by the H.264 standard) to start a new slice. When the transcoder 7050 encounters the slice header, the CABAC context is reset. However, in some embodiments, a transcoder 7050 may, for example, implement a double buffering mechanism so that the CABAC context for a previous context may be persisted across context switches.

Figure 4A:
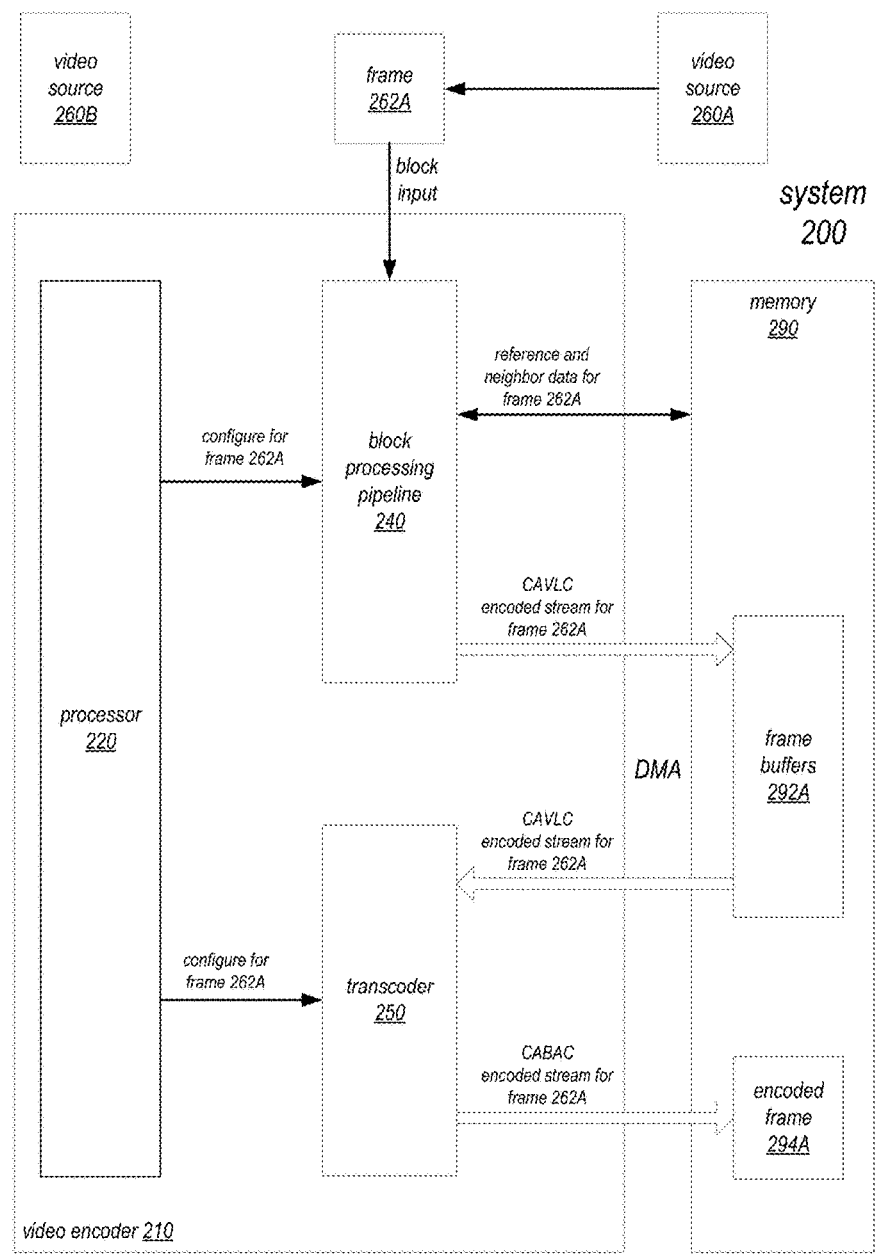
FIGS. 4A through 4H graphically illustrate performing context switches to process a higher-priority frame within a lower priority frame in a video encoder, according to at least some embodiments.
Figure 4B:
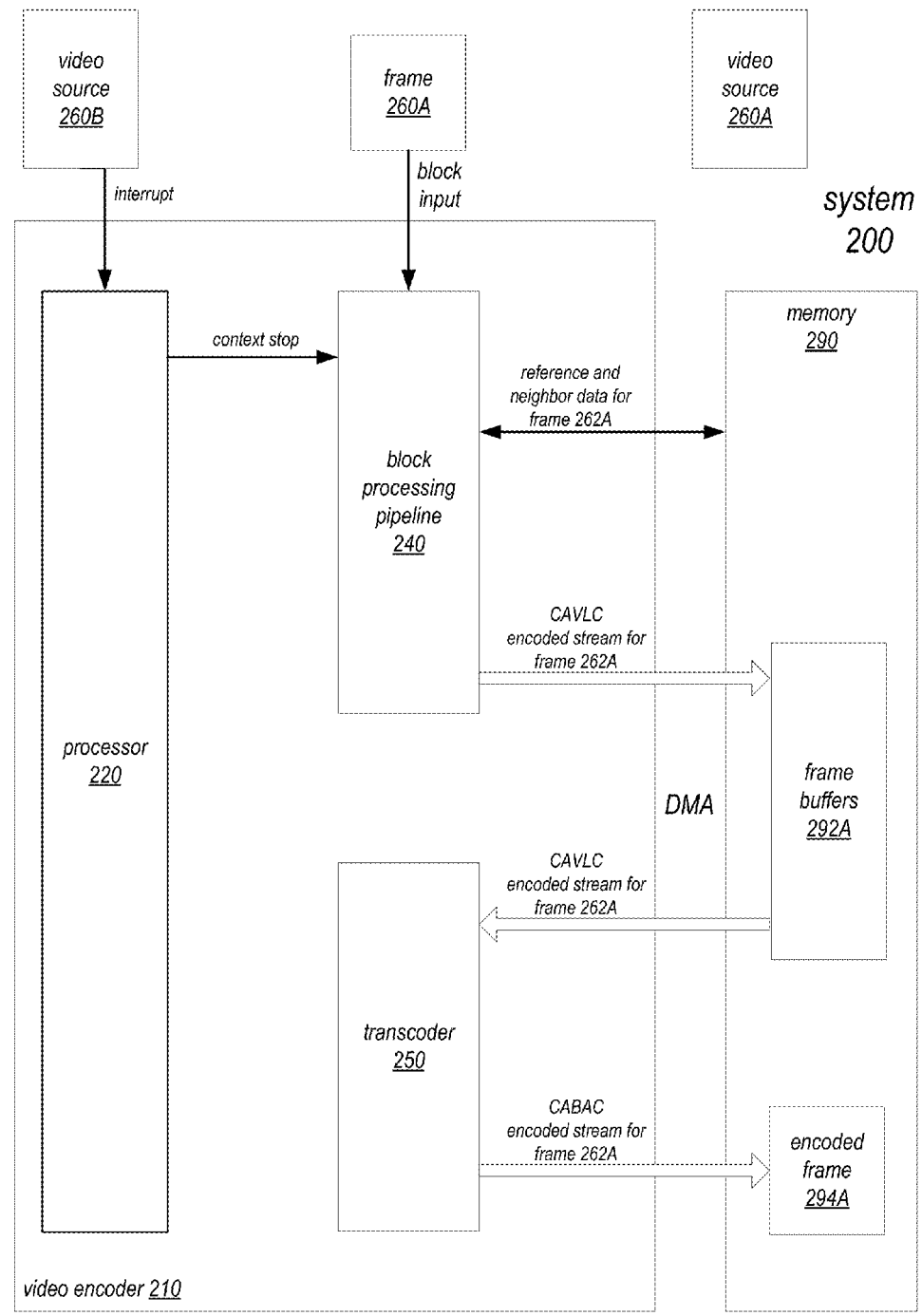

FIGS. 4A through 4H graphically illustrate performing context switches to process a higher-priority frame within a lower priority frame in a vide encoder, according to at least some embodiments. FIG. 5 is a more detailed flowchart of a method for performing a context stop and context restart within a frame to process a low-latency frame in a video encoder, according to at least some embodiments. The elements 300 through 314 of FIG. 5 are explained with reference to FIGS. 4A through 4H.

FIGS. 4A through 4H show an example system 200 that includes a memory 290, an example video encoder 210, and at least two video sources 260A and 260B. The video encoder 210 includes at least one processor 220, a block processing pipeline 240, and a transcoder 250. The processor 220 may perform pipeline 240 and transcoder 250 configuration, and may provide interfaces to external software and/or hardware for video encoder 210 configuration and control. The block processing pipeline 240 may include multiple stages, each stage configured to perform one or more operations on blocks of pixels from input frames passing through the pipeline. The block processing pipeline 240 and transcoder 250 may be configured to access a memory 290 external to the video encoder 210, for example via direct memory access (DMA) through a memory management unit (MMU) of the video encoder 210 (not shown), for example to read blocks from an input frame, to access luma and chroma reference data from previously processed frames in the video stream and neighbor data from previously processed rows in the current frame stored in memory 290, and to stream encoded data to and from the memory 290. In at least some embodiments, transcoder 250 reads data from frame buffer(s) 292 in memory 290 via DMA, performs a transcoding operation on the data, and outputs the transcoded data. For example, in some embodiments, the transcoder 250 may perform a memory-to-memory transcoding or conversion of a CAVLC (context-adaptive variable-length coding) encoded stream output by the pipeline 240 to a CABAC (context-adaptive binary arithmetic coding) encoded stream. In some embodiments, the transcoder 250 may also reorder the blocks from the processing order used in the pipeline (e.g., knight's order) to generate the stream output in scan order.

In at least some embodiments, the video encoder 210 may be configured to input and process blocks of pixels from an input frame 262 through the block processing pipeline 240 and transcoder 250 according to row groups (e.g., in row groups each containing four rows of blocks, referred to as quadrows). In some embodiments, the video encoder 210 may be configured to process the blocks in the row groups according to a knight's order as described herein. However, other block processing methods and orders may be used.

As indicated at 300 of FIG. 5, a block processing pipeline starts processing a frame. Referring to FIG. 4A, a frame 262A has been received from a video source 260A for processing. Processor 220 configures pipeline 240 and transcoder 250 to process the frame 262A. Pipeline 240 begins reading and processing blocks from frame 262A. When processing the blocks, one or more stages of the pipeline 240 may access memory 290 via DMA, for example to access reference data from one or more previously processed frames in the video stream when performing inter-frame estimation, motion compensation, and reconstruction. In addition, in some embodiments, the pipeline 240 may write processed blocks from the bottom row of a row group to a neighbor data structure in memory 290 for access when processing blocks on the top row of a next row group. In at least some embodiments, the pipeline 240 may output a CAVLC encoded stream to frame buffer(s) 292A in memory 290 via DMA. Transcoder 250 reads data from frame buffer(s) 292A in memory 290 via DMA, performs a transcoding operation (e.g., CAVLC-to-CABAC encoding) on the data, and outputs the transcoded data to encoded frame 294A in memory 290 via DMA.

As indicated at 302 of FIG. 5, an indication of a higher priority frame is received by the video encoder. However, as shown in FIG. 4B, video encoder 210 may still be processing frame 262A from video source 260A. Another video source 260B may notify video encoder 210 that a higher-priority, low-latency frame needs to be processed, for example via an interrupt to processor 220.

As indicated at 304 of FIG. 5, the video encoder directs the pipeline to stop the current context for the frame currently being processed. As indicated at 306 of FIG. 5, the video encoder waits for the pipeline to stop the context. Referring again to FIG. 4B, in response to the notification from video source 260B, processor 220 issues a context stop to block processing pipeline 240 for frame 262A. In at least some embodiments, the block processing pipeline 240 may only stop processing within a frame for a context switch at certain locations, for example at the end of a row group. Thus, pipeline 240 may continue to process blocks from frame 262A until a valid stopping location is reached.

In at least some embodiments, the context stop is issued to a first stage of the pipeline 240. When the first stage determines that a valid stopping location is reached, for example upon reading the last block in the last row of a row group, the context stop may be passed through the stages of the pipeline with the last block in the context to notify the other stages that a context stop is being performed at this location in the frame 262A. A downstream stage of the pipeline 240 that outputs the CAVLC encoded stream for frame 262A to frame buffer(s) 292A may embed marker(s) in the stream at or after the last block in the context, for example a context stop and/or slice header, to signal the context stop to the transcoder 250.

Figure 4C:
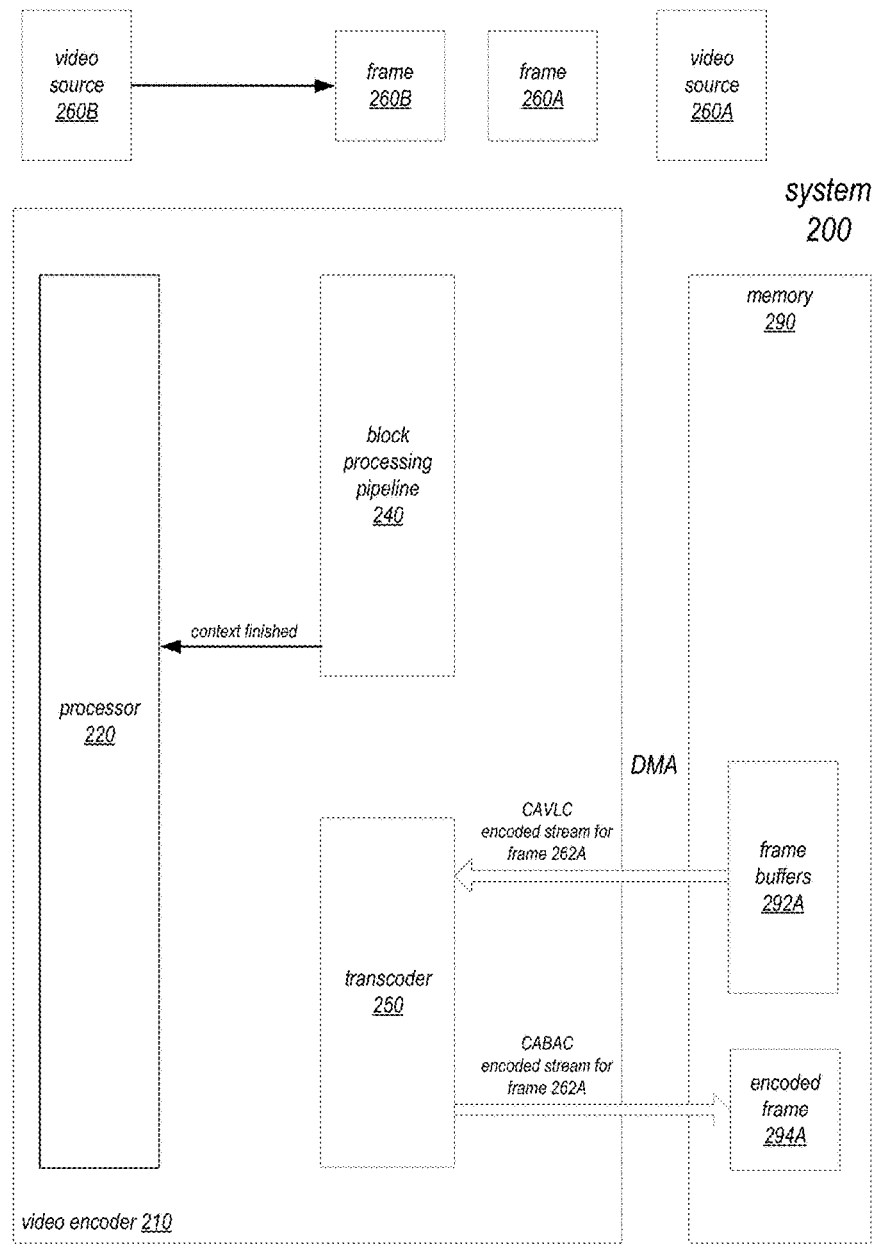
Figure 5:
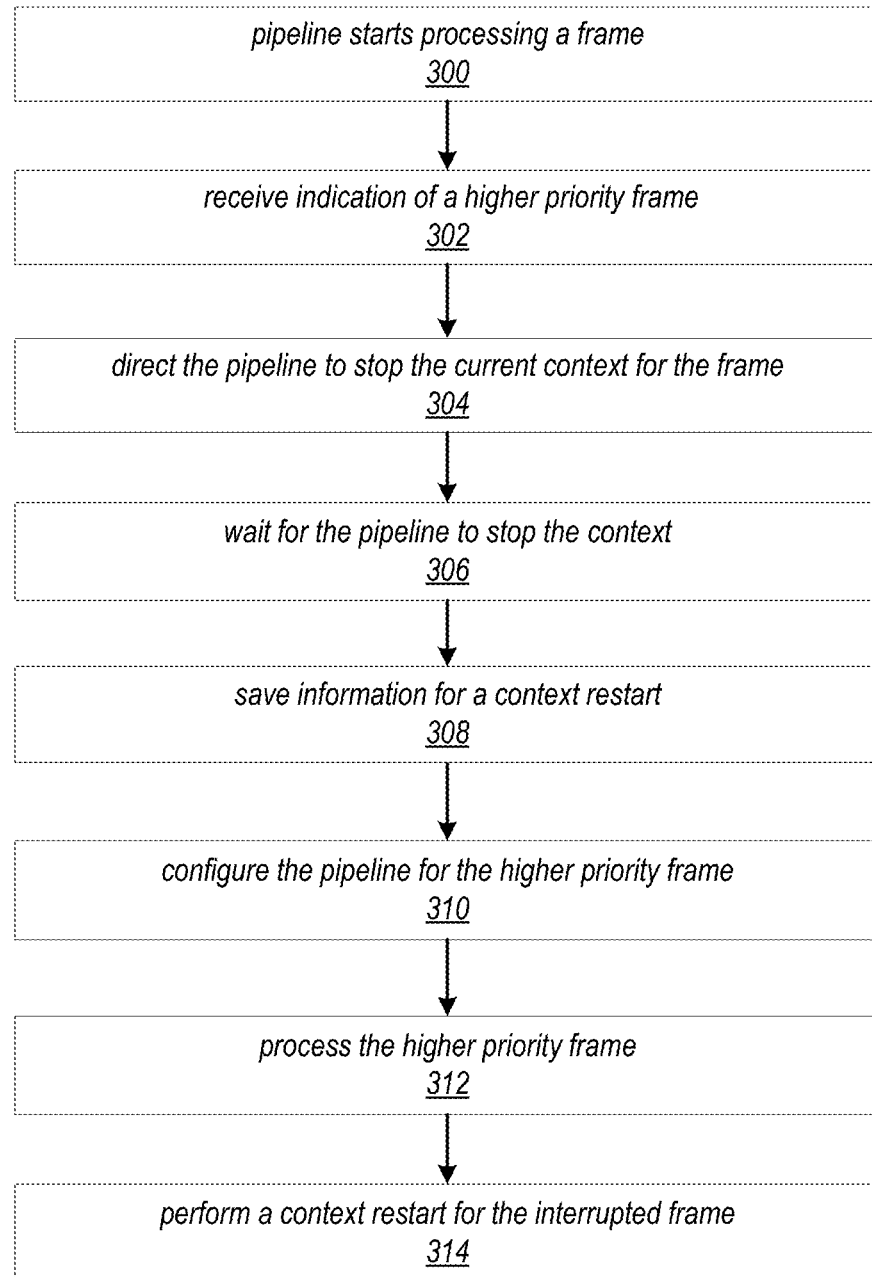
FIG. 5 is a more detailed flowchart of a method for performing a context stop and restart within a frame to process a low-latency frame in a video encoder, according to at least some embodiments.

As shown in FIG. 4C, block processing pipeline 240 has reached a valid stopping location in the frame 262A (e.g., the last block in the last row of a row group), processed the blocks from frame 262A up to the stopping location, and output the processed blocks to frame buffer(s) 292A. The pipeline 240 may signal to the processor 220 that the context stop has been executed in the pipeline 240, and that the current context has finished in the pipeline 240.

As indicated at 308 of FIG. 5, information for a context restart for the frame may be saved. For example, referring to FIG. 4C, the stopping location in frame 262A for the current context may be passed to and saved by processor 220. In addition, a neighbor data structure in memory 290 that stores information from the processed blocks on the last row of the current context may be persisted in memory 290.

In some embodiments, the transcoder 250 may continue to read and transcode the processed data for frame 262A from frame buffer(s) 292A until the end of the context is detected.

Figure 4D:
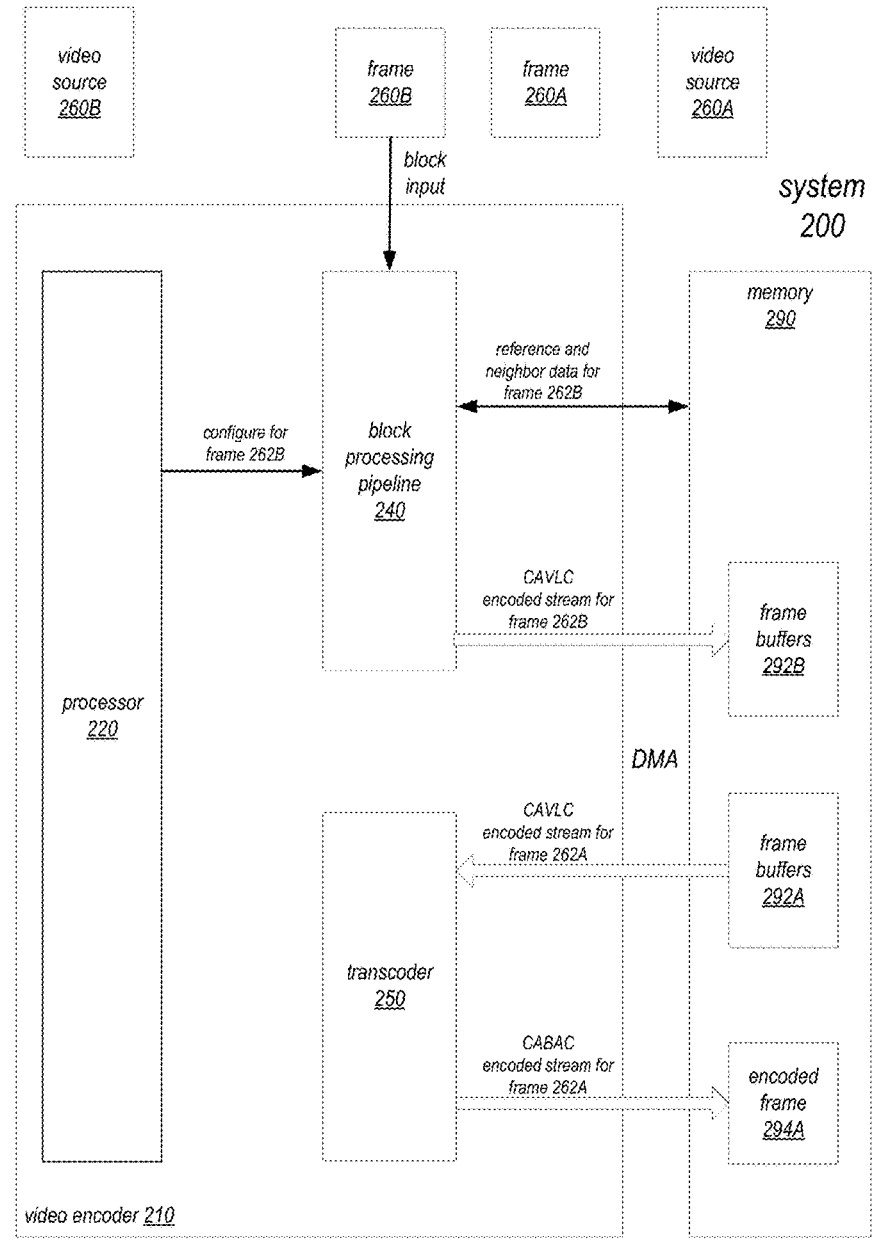

As indicated at 310 of FIG. 5, the video encoder may configure the pipeline for processing the higher-priority frame and, as indicated at 312 of FIG. 5, the higher-priority frame is processed in the video encoder. Referring to FIG. 4D, processor 220 configures pipeline 240 to process frame 262B from video source 260B. Pipeline 240 begins reading and processing blocks from frame 262B. When processing the blocks from frame 262B, the pipeline 240 may access memory 290 via DMA to access reference data, neighbor data, and so on for frame 262B. In at least some embodiments, the pipeline 240 may output a CAVLC encoded stream for frame 262B to frame buffer(s) 292B in memory 290 via DMA. Note that the transcoder 250 may continue to read and transcode the processed data for frame 262A from frame buffer(s) 292A until the end of the context is detected.

Figure 4E:
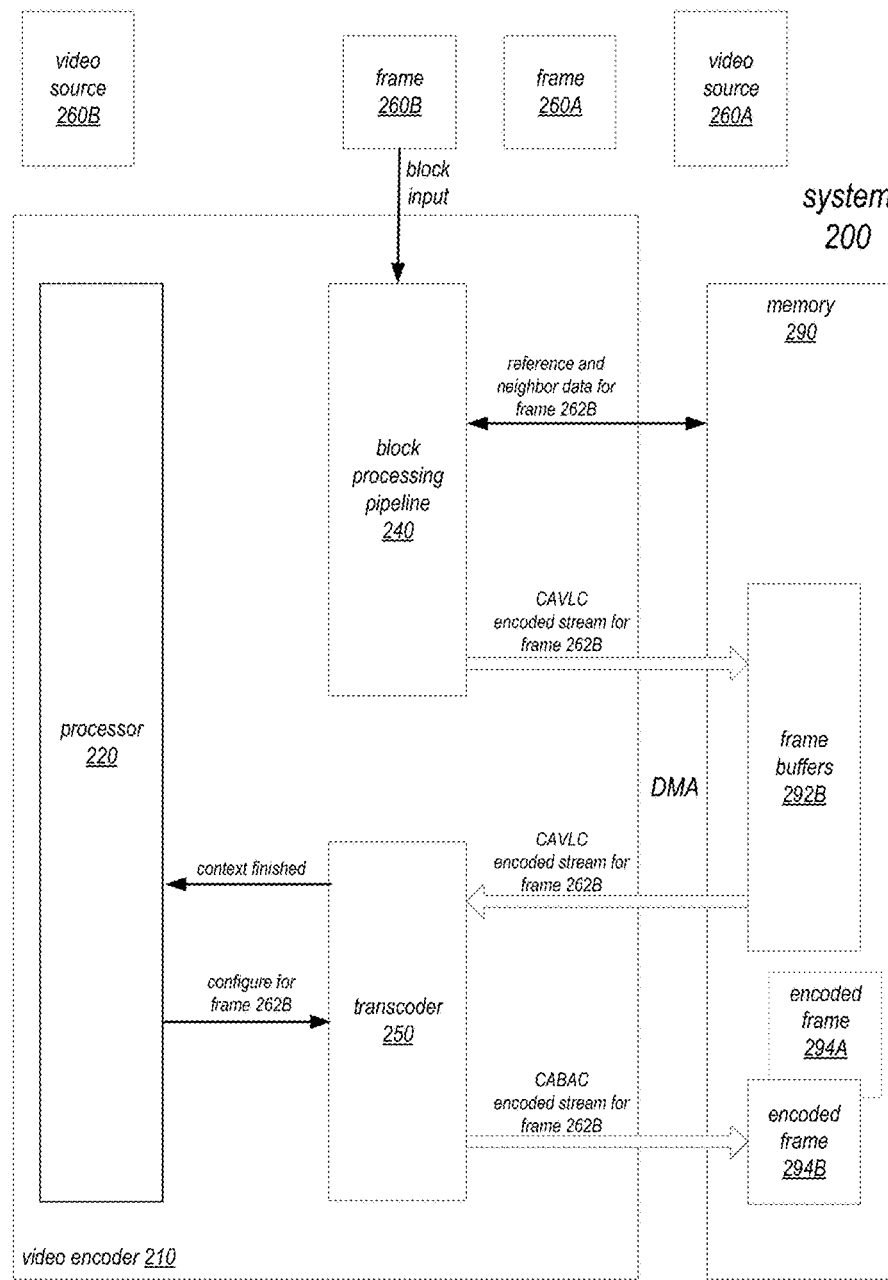

In FIG. 4E, transcoder 250 has detected the end of the context for frame 262A, for example an end of context marker or slice header in the stream being read from frame buffer(s) 292A. In some embodiments, the CABAC context of the transcoder 250 may be reset in response to the slice marker in the stream. Transcoder 250 may signal processor 220 that the context has been completed, and processor 220 may then configure the transcoder 250 to process frame 262B. Transcoder 250 begins reading data from frame buffer(s) 292B in memory 290 via DMA, performing a transcoding operation (e.g., CAVLC-to-CABAC encoding) on the data, and outputting the transcoded data to encoded frame 294B in memory 290 via DMA. Note that the content of encoded frame 294A may be persisted in memory 290.

Figure 4F:
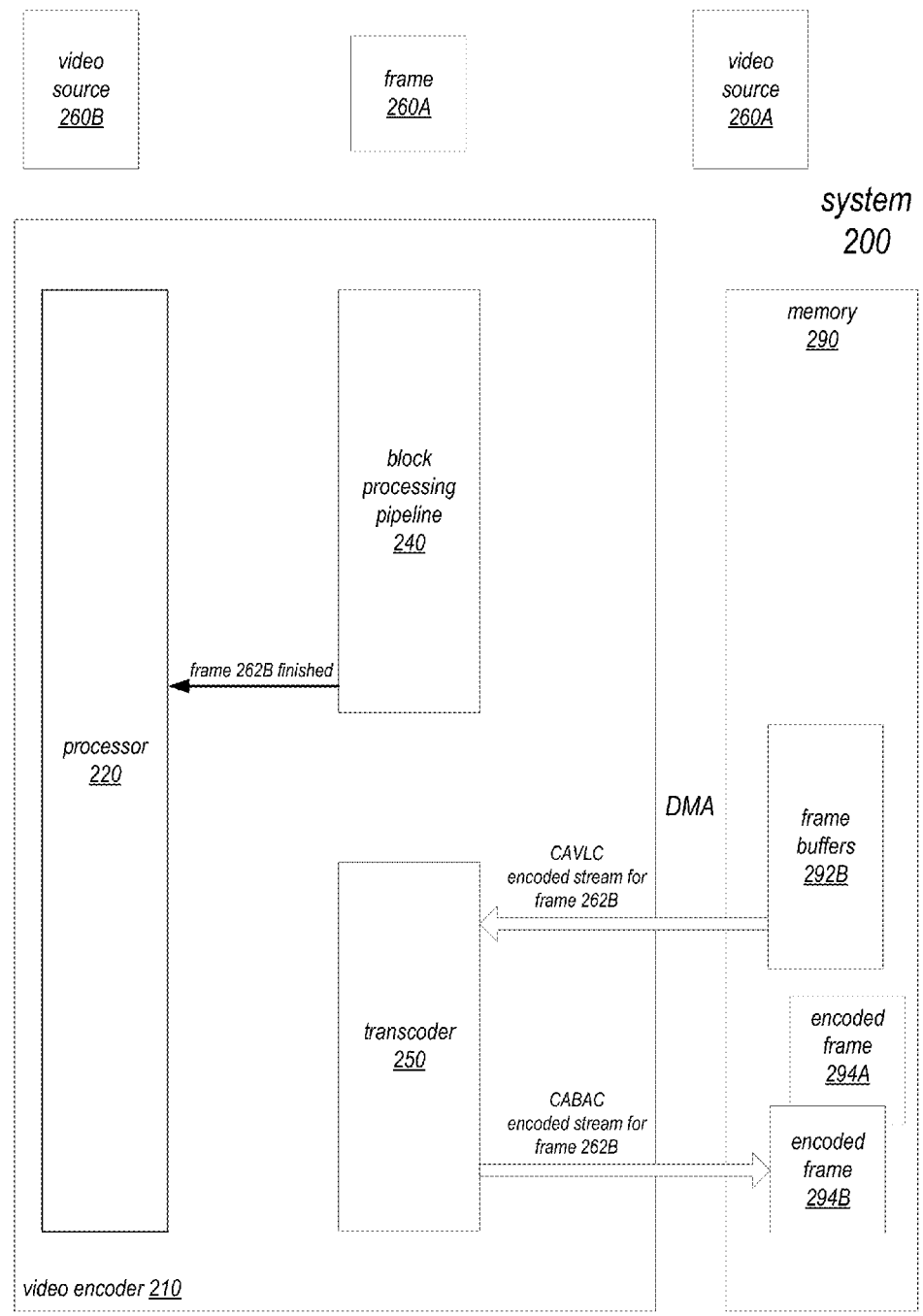
Figure 4G:
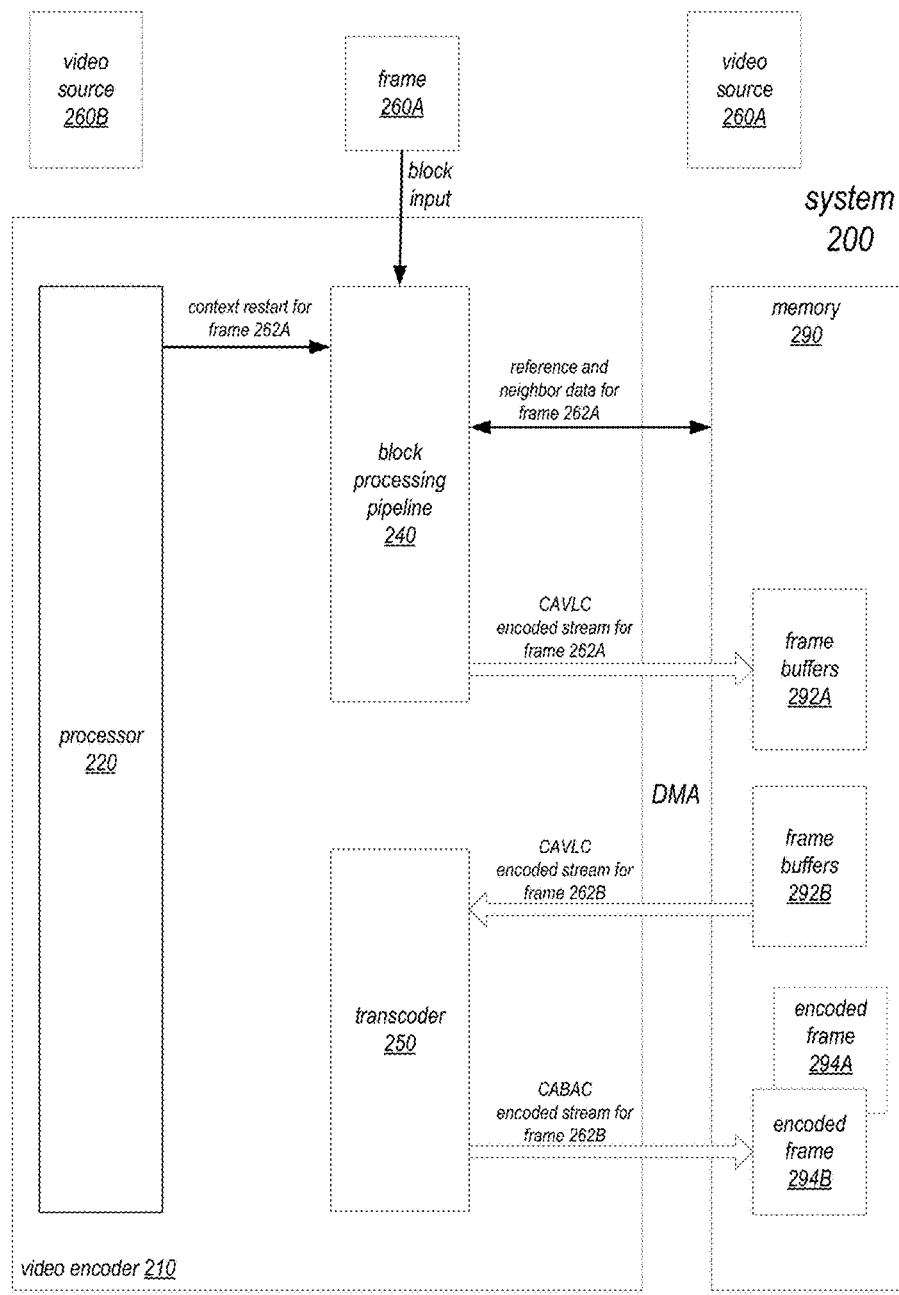
Figure 4H:
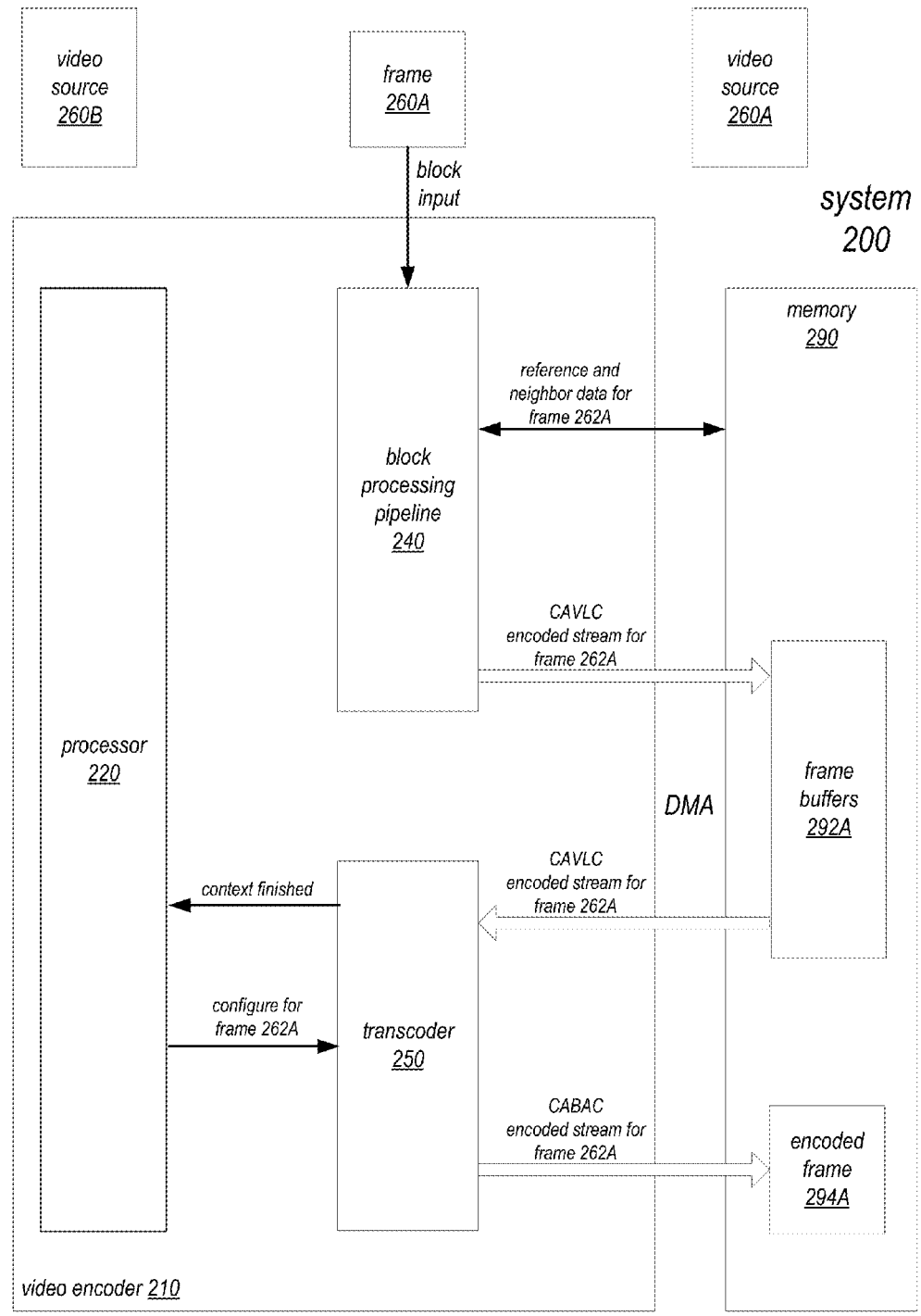

As indicated at 314 of FIG. 5, the video encoder performs a context restart for the frame that was interrupted by the higher-priority frame. Referring to FIG. 4F, block processing pipeline 240 has finished processing frame 262B, and has output the processed blocks to frame buffer(s) 292B. The pipeline 240 may signal to the processor 220 that the frame 262 has been processed through the pipeline 240. Note that the transcoder 250 may continue to read and transcode the processed data for frame 262B from frame buffer(s) 292B until the end of the frame is reached. In FIG. 4G, processor 220 may perform a context restart for frame 262A in pipeline 240. The stopping location in frame 262A for the previous context may be used as an offset into frame 262A for the start of the new context. In addition, information from the processed blocks on the last row of the previous context that was persisted in a neighbor data structure in memory 290 may be read into the pipeline 240. Other configurations of pipeline 240 to process frame 262A may also be performed. Pipeline 240 begins reading and processing blocks from frame 262A from the start location for the new context. In at least some embodiments, the pipeline 240 may output a CAVLC encoded stream for the new context in frame 262A to frame buffer(s) 292A in memory 290 via DMA. Note that the transcoder 250 may continue to read and transcode the processed data for frame 262B from frame buffer(s) 292B until the end of the frame is reached. In FIG. 4H, transcoder 250 has detected the end of the frame 262B in frame buffer(s) 292B. In some embodiments, the CABAC context of the transcoder 250 may be reset in response to the end of frame. Transcoder 250 may signal processor 220 that the frame 262B has been completed, and processor 220 may then configure the transcoder 250 to process the new context from frame 262A. Transcoder 250 begins reading the data for the context from frame buffer(s) 292A in memory 290 via DMA, performing a transcoding operation (e.g., CAVLC-to-CABAC encoding) on the data, and appending the transcoded data for the context to encoded frame 294A in memory 290 via DMA.

While FIGS. 3 through 5 generally describe performing a context stop and restart of a frame to allow a higher-priority, low latency frame to be processed through the video encoder, note that context switches as described herein may be performed in a video encoder for other reasons. In addition, while FIGS. 3 through 5 generally describe performing a single context stop and context restart within a frame, two or more context stops and restarts may be performed within a single frame. In addition, while FIGS. 3 through 5 generally describe performing context switches in a video encoder to simultaneously process video streams from two video sources, context switching may be used to simultaneously process video streams from more than two video sources.

Figure 6:
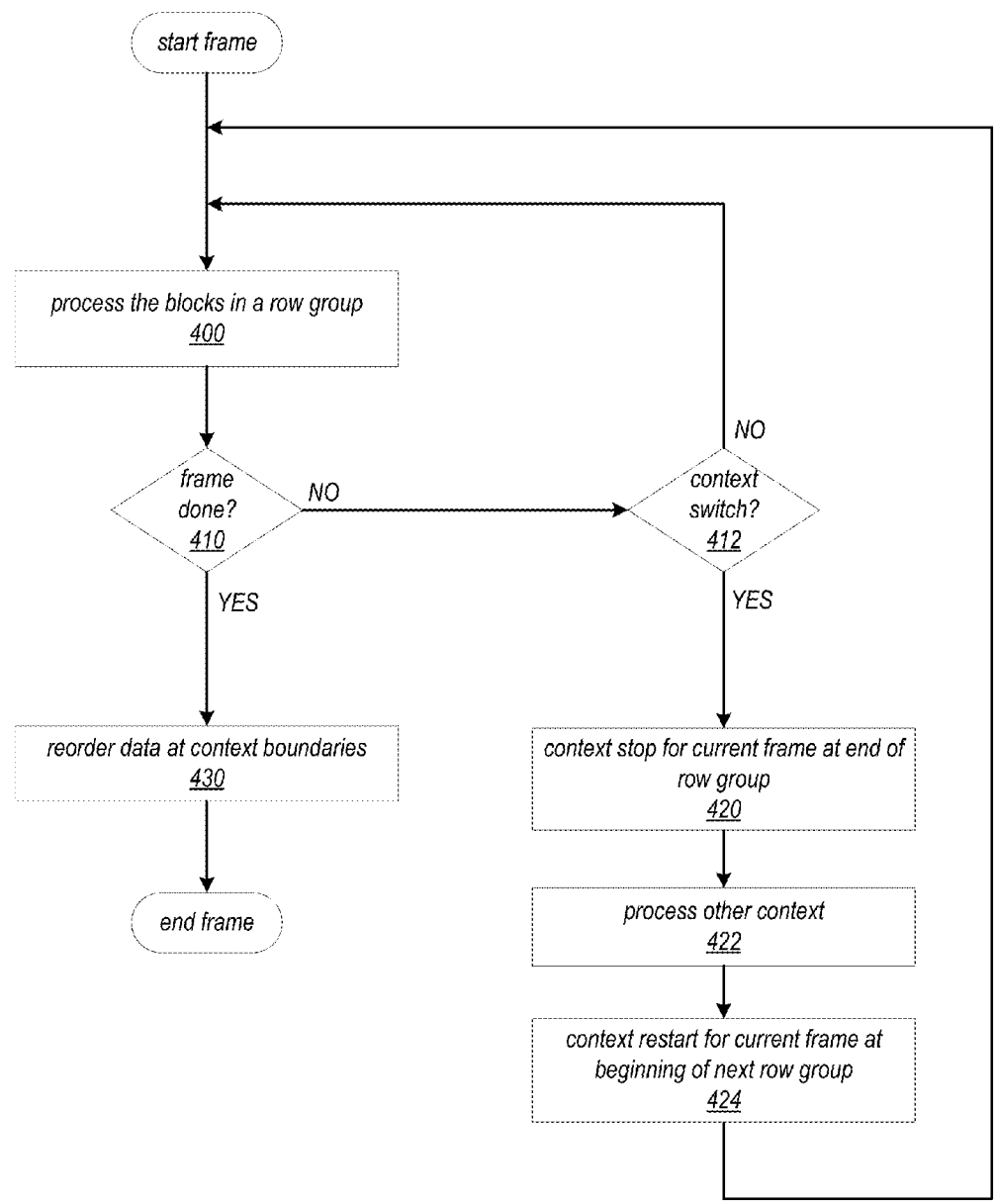
FIG. 6 is a flowchart of a method for performing context switches in a block processing pipeline when processing a frame by row groups, according to at least some embodiments.
Figure 8:
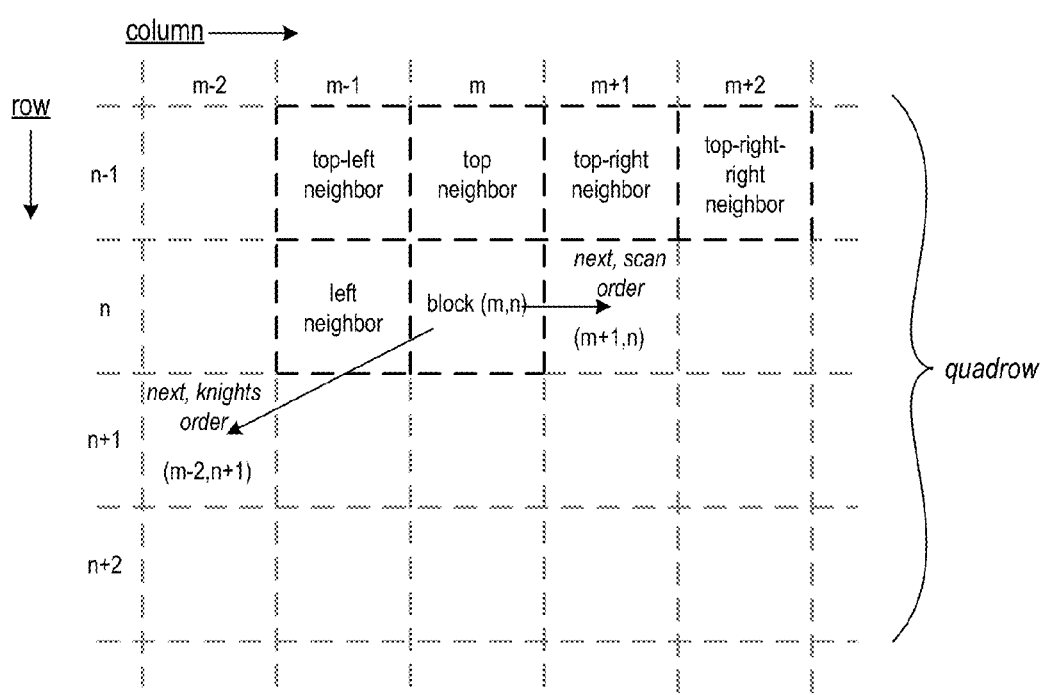
FIG. 8 shows neighbor blocks of a current block in a frame, and further illustrates a knight's order processing method for the blocks, according to at least some embodiments.

FIG. 6 is a flowchart of a method for performing context switches in a block processing pipeline when processing a frame by row groups, according to at least some embodiments. FIG. 6 also illustrates that multiple context switches may be performed within a frame. As illustrated in FIGS. 8 through 10B, in some embodiments, a video encoder may be configured to process blocks of pixels from an input frame according to row groups (e.g., in row groups each containing four rows of blocks, referred to as quadrows), and may be configured to process the blocks in the row groups according to a knight's order processing method. In some embodiments, the pipeline may be configured to stop processing for the current context only at the end of a row group.

As indicated at 400 of FIG. 6, the video encoder block processing pipeline starts processing the blocks from a frame by row groups, for example by quadrows according to a knight's order processing method as illustrated in FIGS. 8 through 10B. At any time during processing of the current frame, the video encoder may receive an indication that a context switch is requested, for example an interrupt from a higher-priority video source to process a low-latency frame. As noted above, the pipeline may be configured to stop processing for the current context only at the end of a row group. At the end of a row group, if at 410 it is not the end of the frame, and at 412 a context switch has not been requested, then the pipeline returns to 400 and begins processing a next row group from the frame. However, at 412, if a context switch has been requested, then a context stop is performed for the current frame as indicated at 420, another context (e.g., the higher priority frame) is processed in the pipeline as indicated at 422, and after the other context has completed a context restart is performed for the current frame as indicated at 424 to restart pipeline processing of the current frame beginning at the first row of the next row group.

Figures 7A, 7B, 7C, 7D, 7E:
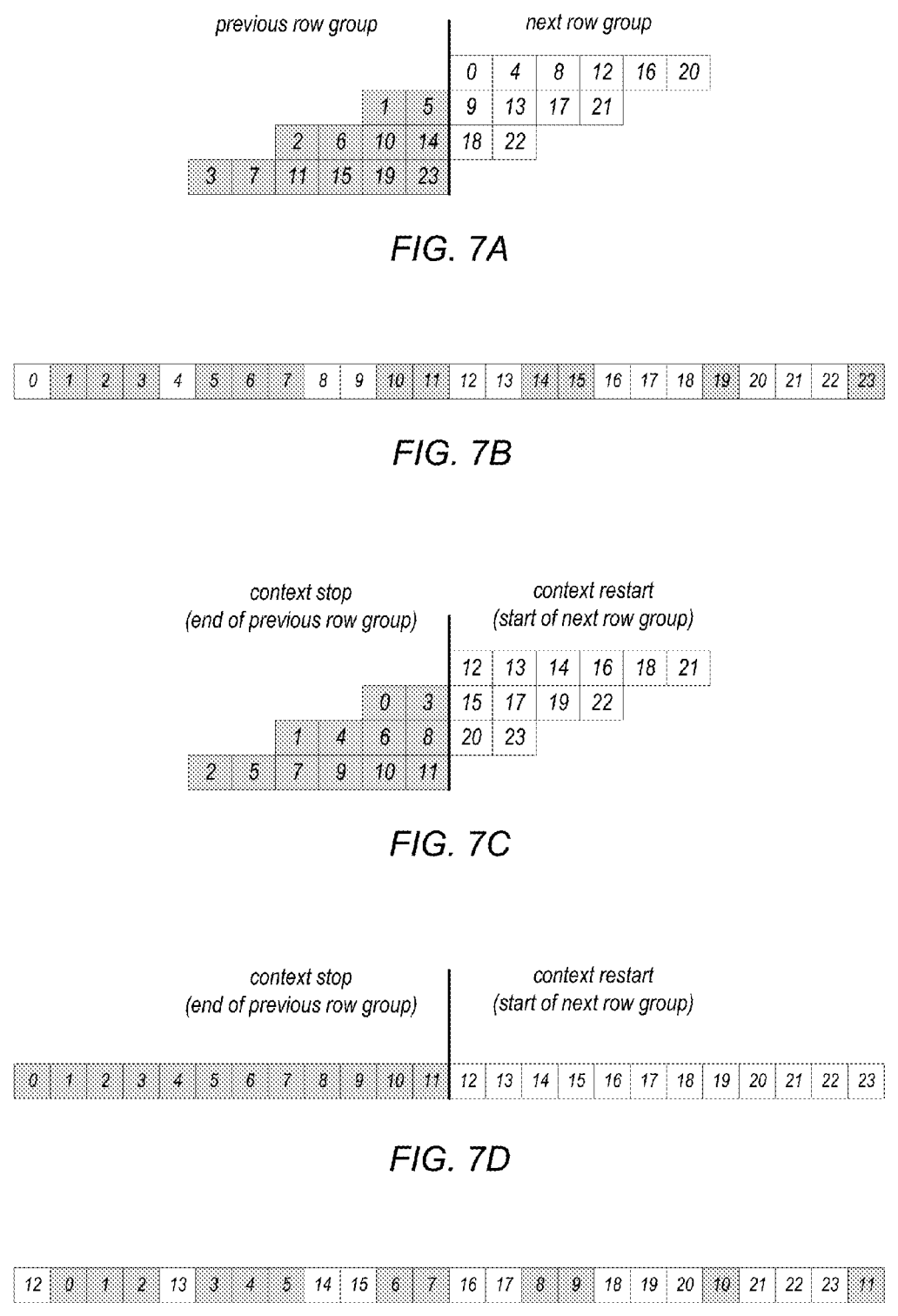
Figure 9A:
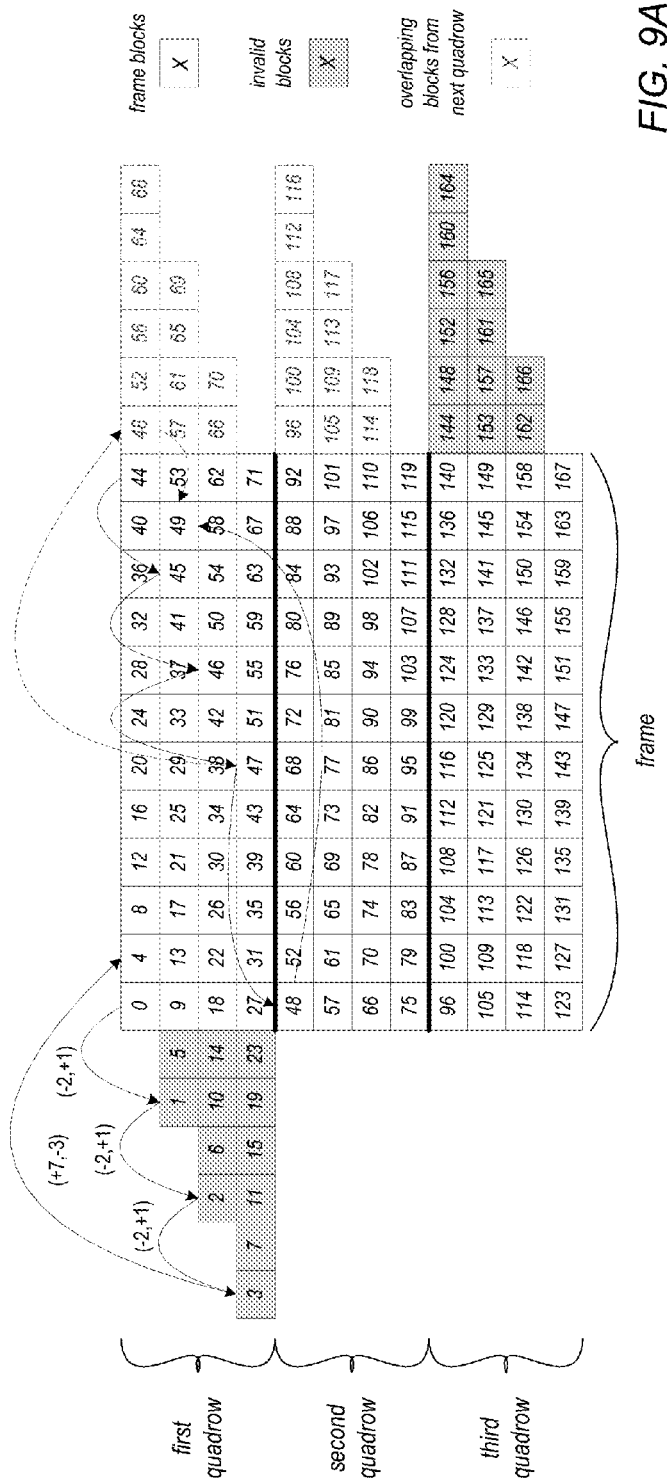
FIGS. 9A and 9B graphically illustrate the knight's order processing method including the algorithm for determining a next block, according to at least some embodiments.
Figure 9B:
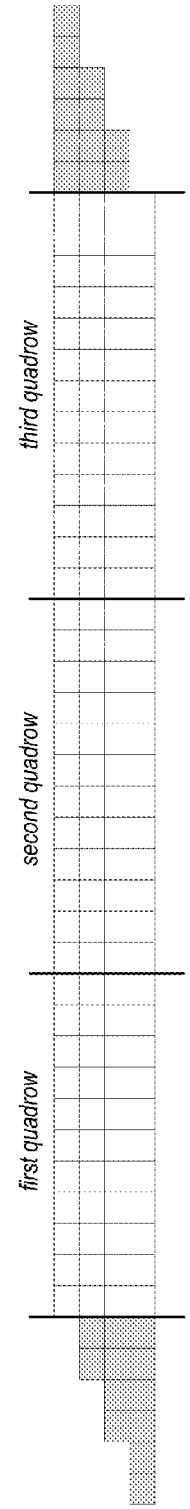

In some embodiments of a block processing pipeline, as indicated at 430 of FIG. 6, after the frame is done, if a context stop and restart has been performed within the frame, then the processed blocks may need to be reordered on row group boundaries between contexts so that the blocks are ordered in an interleaved manner as expected by other components or processes. FIGS. 7A through 7E graphically illustrate reordering blocks on row group boundaries between contexts, according to at least some embodiments. As previously mentioned, in some embodiments, the video encoder may be configured to process the blocks in the row groups according to a knight's order processing method, for example as illustrated in FIGS. 8 through 10B. As shown in FIGS. 9A and 9B, the knight's order processing method using row group (e.g., quadrow) boundaries may process the row groups in a frame as if the row groups are arranged end to end. Thus, several blocks at the end of a row group are interleaved with blocks from the beginning of the next row group. FIG. 7A shows the processing order of the blocks at a row group boundary, according to at least some embodiments. FIG. 7B shows how the processed blocks from FIG. 7A would be interleaved in memory. However, when a context stop and context start are performed on a row group boundary, the processing order is as shown in FIG. 7C, and the processed blocks would be arranged as shown in FIG. 7D. Thus, in some embodiments the processed blocks in memory as shown in FIG. 7D may be rearranged as shown in FIG. 7E so that the blocks are in the expected interleaved order.

Knight's Order Processing

Embodiments of block processing methods and apparatus are described in which, rather than processing blocks in a pipeline according to scan order as in conventional methods, the blocks are input to and processed in the pipeline according to an order referred to herein as "knight's order." Knight's order is in reference to a move of a chess knight piece in which the knight moves one row down and two columns to the left. Note, however, that "knight's order" as used herein more generally encompasses movements of one row down and p columns to the left, where p may be but is not necessarily 2.

The knight's order processing method may provide spacing (one or more stages) between adjacent blocks in the pipeline, which, for example, facilitates feedback of data from a downstream stage of the pipeline processing a first block to an upstream stage of the pipeline processing a second block that depends on the data from the first block. One or more stages of a block processing pipeline may require information from one or more other neighbor blocks when processing a given block. FIG. 3 shows neighbors of a current block (m,n) from which information may be required—left (m−1,n); top (m,n−1); top-left (m−1,n−1); top-right (m+1,n−1); and top-right-right (m+2,n−1). These requirements for information from neighbor block(s) may be referred to as dependencies. For example, referring to FIG. 3, information from the left neighbor of block (m,n) may be required to perform a particular operation on the block. In the knight's order processing method, rather than inputting block (m+1, n) into the pipeline immediately after block (m,n), the next block input to the pipeline is block (m−2, n+1). Inputting the blocks into the pipeline in knight's order rather than scan order provides spacing (e.g., one or more stages) between adjacent blocks on a row in the pipeline.

In at least some embodiments of the knight's order processing method, the rows of blocks in the input frame may be divided into sets of four rows, referred to herein as quadrows, with the knight's order processing method constrained by the quadrow boundaries. Referring to FIG. 3, when using quadrow boundaries with knight's order processing block (m−1,n) will be four stages downstream when block (m,n) is input to the pipeline, and block (m,n) will be four stages downstream when block (m+1,n) is input to the pipeline. Thus, blocks that are adjacent on a row will be spaced four stages apart in the pipeline. Thus, at stages in which operations are performed on a block that depend on left neighbor information, the information for the left neighbor is more likely to be readily available with less latency than it would be if processing the blocks in scan order. In addition to dependencies on the left neighbor, one or more operations of a block processing method may depend on neighbor blocks from the previous (or above) row such as the top neighbor, top-left neighbor, top-right neighbor, and top-right-right neighbor blocks as shown in FIG. 3. The knight's order processing method with quadrow constraints provides locality of neighbor information that may be leveraged to provide local caching of this neighbor data at each stage in relatively small buffers.

In at least some embodiments, a basic algorithm for determining a next block to input to the pipeline according to the knight's order processing method using quadrow constraints is as follows:

If not on the bottom row of a quadrow:
　The next block is two columns left, one row down (−2,+1).
Otherwise, at the bottom row of a quadrow:
　The next block is seven columns right, three rows up (+7,−3).

However, the knight's order processing method may also be implemented with other spacing than two blocks left, one block down (−2,+1). For example, instead of two blocks left and one block down, the method may be implemented to go three blocks left and one block down to get the next block. As another example, the method may be implemented to go one block left and one block down (−1,+1) to get the next block. In addition, the knight's order processing method may be implemented with other row constraints than quadrow (four row) constraints. In other words, row groups of at least two rows may be used in embodiments to constrain the knight's order processing method. Assuming r as the number of rows used to constrain the knight's order processing method, the algorithm may be generalized as:

If not on the bottom row of a row group:
　The next block is p columns left, one row down (−p,+1).
Otherwise, at the bottom row of a row group:
　The next block is q columns right, (r−1) rows up (+q,−(r−1)).

Changing the value of p would affect the value of q, would not affect spacing between adjacent blocks from a row in the pipeline, but would affect spacing between a given block and its other neighbor blocks (e.g., its top-left, top, and top-right neighbors). In particular, note that using the spacing (−1,+1) would result in a block and its diagonal (top-right) neighbor block being concurrently processed at adjacent stages of the pipeline. Thus, a spacing of at least two blocks left may be used so that diagonally adjacent blocks are not concurrently processed at adjacent stages of the block processing pipeline. Changing the value of r would affect the value of q, would affect spacing between adjacent blocks from a row in the pipeline, and would affect spacing between the block and its other neighbor blocks (e.g., its top-left, top, and top-right neighbors).

The above algorithm for determining a next block may begin at an initial block. Upon reaching the end of a quadrow that is followed by another quadrow, the algorithm jumps to the first block of the next quadrow and then crosses over between the quadrow and the next quadrow for a few cycles, resulting in the interleaving of some blocks from the end of the quadrow with some blocks from the beginning of the next quadrow. In other words, the knight's order processing method treats the quadrows as if they were arranged end to end. To avoid complications in the algorithm and to maintain consistent spacing of blocks in the pipeline, at least some embodiments may pad the beginning of the first quadrow and the end of the last quadrow with invalid blocks. An invalid block may be defined as a block that is outside the boundary of the frame and that is input to the pipeline but that does not contain valid frame data, and thus is not processed at the stages. The algorithm for determining a next block may thus begin at an initial block, which may be either the first block in the top row of the first quadrow or an invalid block to the left of the first block in the top row of the first quadrow, proceed through all of the quadrows, and at the end of the last quadrow continue until the last block of the last quadrow has been input to the pipeline. There will be bubbles in the pipeline at the beginning and end of the frame, but the spacing of the valid blocks from the frame in the pipeline will remain consistent throughout. In some embodiments, as an alternative to padding the end of the last quadrow of a video frame with invalid blocks, the last quadrow of a video frame may be overlapped with the first row of the next video frame to be processed in the block processing pipeline.

FIGS. 9A and 9B graphically illustrate the knight's order processing method, according to at least some embodiments. For simplicity, these Figures use an example 192×192 pixel frame divided into 144 16×16 pixel blocks, with 12 rows and 12 columns of blocks. However, it is to be noted that the knight's order processing method can be applied to input video frames of any dimensions. In FIG. 9A, an example frame is divided into rows and columns of blocks. The rows of blocks are partitioned into three quadrows including four rows each. The last three rows of the first quadrow are padded on the left with invalid blocks, and the first three rows of the last (third) quadrow are padded on the right with invalid blocks. In this example, the numbers in the blocks represent the order in which the blocks are input to the block processing pipeline according to the knight's order processing method, beginning with block 0 (the first block in the top row of the first quadrow). Block 0 is input to the first stage of the pipeline, and when the first stage is ready for another block, the method proceeds by going two columns left, one row down to get the next block for input (block 1, in FIG. 9A). This pattern is repeated until reaching the bottom of the quadrow. At the bottom of the quadrow, the method goes seven columns right, three rows up to get the next block. This continues until all of the blocks in the frame (as well as all of the invalid blocks shown in FIG. 9A) are input into the pipeline. When the end of a quadrow is reached, if there is another quadrow after the quadrow the input algorithm proceeds to the beginning of the next quadrow. In this example, after block 47 is input, the method proceeds to block 48 (the first block in the top row of the second quadrow). As shown by the dashed arrow from block 47 to the dashed rectangle labeled 48 to the right of block 44, the first block of the top row of the second quadrow (block 48) is treated as being immediately to the right of the last block of the top row of the first quadrow (block 44), and thus is reached from block 47 by going seven columns right, three columns up. In other words, the knight's order processing method treats the quadrows as if they were arranged end to end, with invalid blocks at each end, as shown in FIG. 9B. Thus, the algorithm for determining a next block remains the same across the entire frame.

In some embodiments, each row of the first quadrow may be padded with extra invalid blocks, for example with two extra invalid blocks. Instead of beginning with the first block in the top row of the first quadrow as shown in FIG. 9A, input to the pipeline may begin with the first invalid block to the left of the first block in top row of the first quadrow.

Figure 10A:
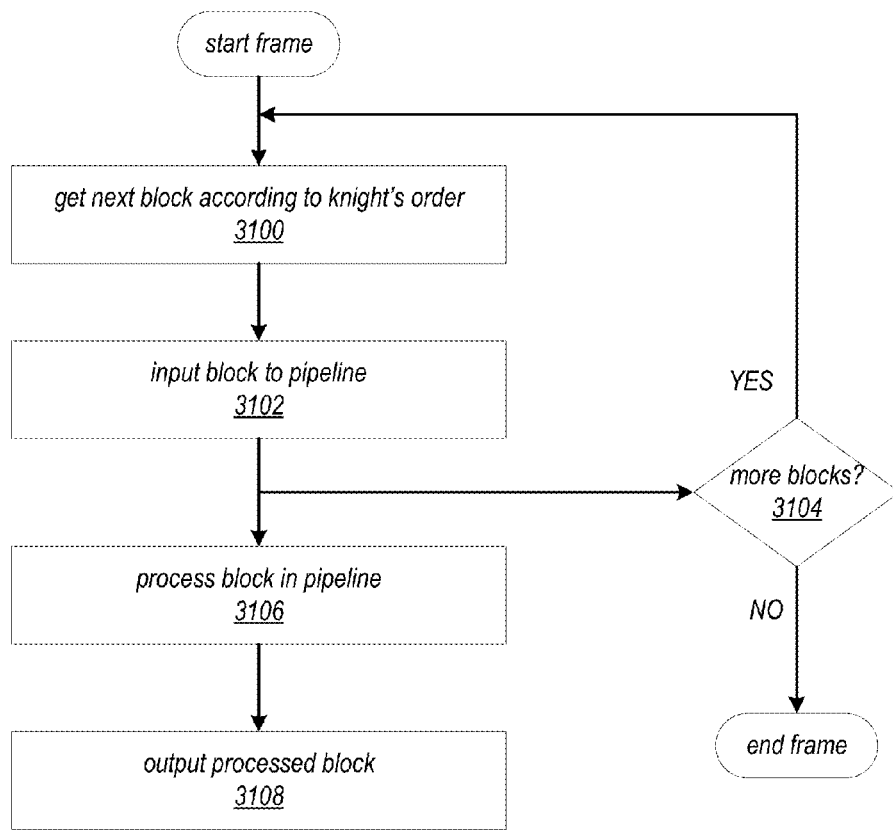
FIGS. 10A and 10B are high-level flowcharts of a knight's order processing method for a block processing pipeline, according to at least some embodiments.
Figure 10B:
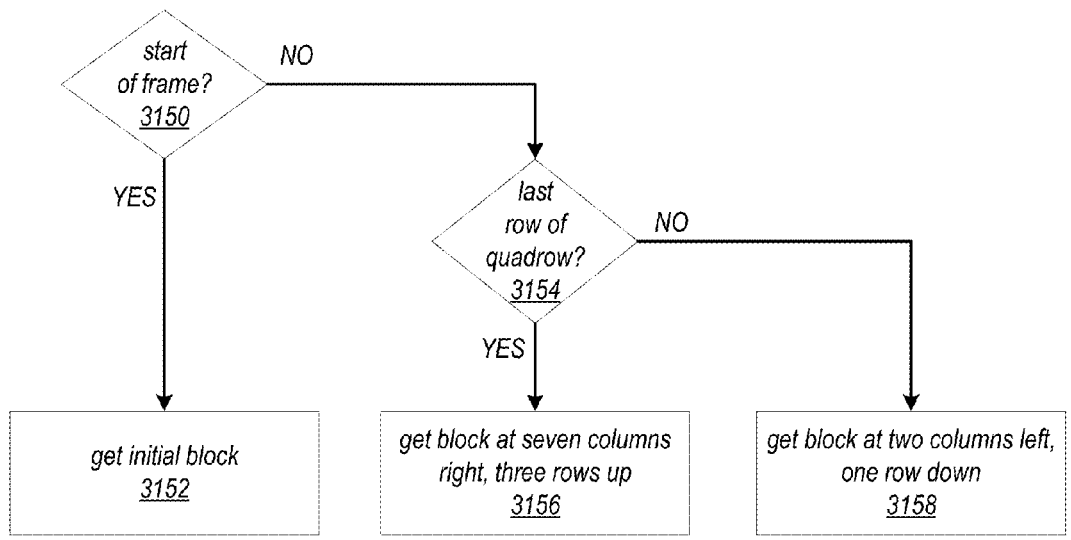
Figure 11A:
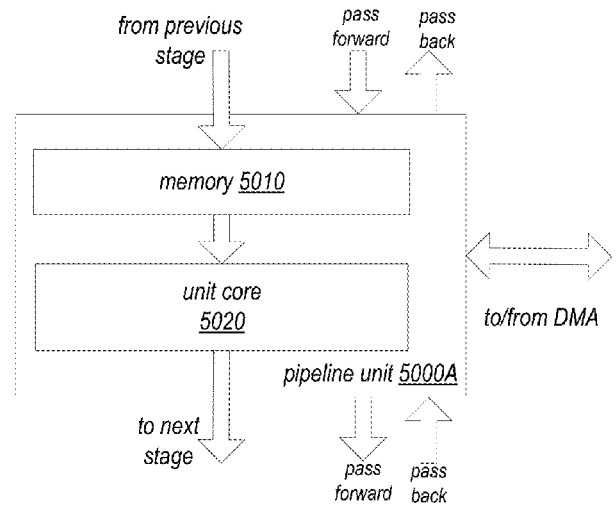
FIGS. 11A and 11B are block diagrams of example pipeline processing units that may be used at the stages of a block processing pipeline that implements one or more of the block processing methods and apparatus as described herein, according to at least some embodiments.
Figure 11B:
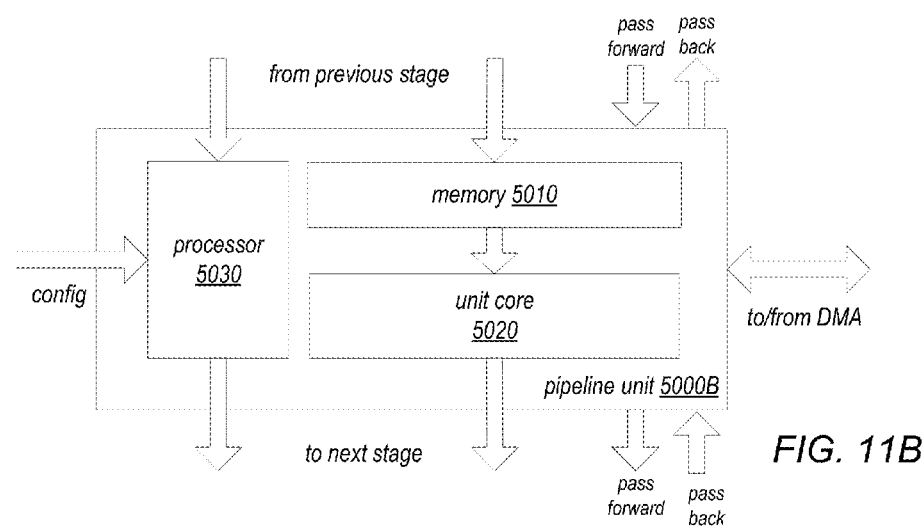
Figure 11C:
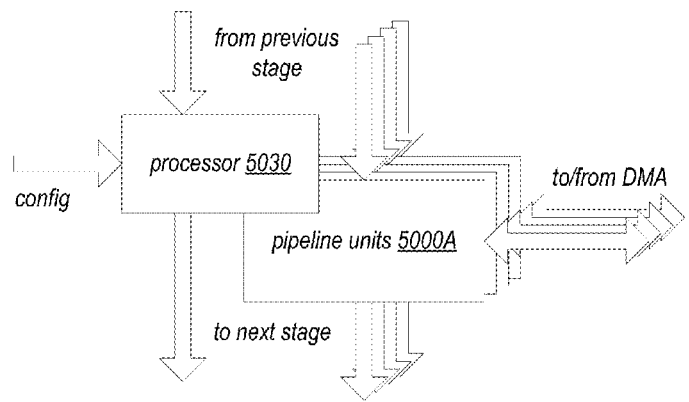
FIG. 11C shows that a single processor may be associated with a group of two or more pipeline units.

FIGS. 10A and 10B are high-level flowcharts of a knight's order processing method for a block processing pipeline, according to at least some embodiments. In FIG. 10A, as indicated at 3100, a next block is determined according to the algorithm for determining a next input block that is implemented by the knight's order processing method. As indicated at 3102, the block is input to the pipeline, for example from a memory via direct memory access (DMA). As shown by 3104, the input process of elements 3100 and 3102 continues as long as there are blocks to be processed. Each block that is input to the pipeline by elements 3100 and 3102 is processed in the pipeline, as indicated at 3106. Each block is initially input to a first stage of the pipeline, processed, output to a second stage, processed, and so on. When a block moves from a stage to a next stage of the pipeline, the stage can begin processing the next block in the pipeline. Thus, the input blocks move through the stages of the pipeline, with each stage processing one block at a time. As indicated at 3108, once a block has been processed by a last stage of the pipeline, the processed block is output, for example to a memory via direct memory access (DMA).

FIG. 10B is a flowchart of an example algorithm for determining a next input block that that may be implemented by the knight's order processing method, and expands on element 3100 of FIG. 10A. FIG. 10B assumes that the frame is divided into quadrows, and that the algorithm used to determine the next frame is two columns left, one row down (−2,+1) if not on the bottom row of a quadrow, seven columns right, three rows up (+7,−3) if on the bottom row. However, other row groupings and/or spacing algorithms may be used. At 3150, if at the start of the frame, the method gets an initial block as indicated at 3152. If this is not the start of the frame, then at 3154, if this is the last row of the quadrow, the next block is seven columns right, three rows up, as indicated at 3156. If this is not the last row of the quadrow, the next block is two columns left, one row down, as indicated at 3158.

Caching Neighbor Data

One or more operations performed at stages of a block processing pipeline may depend on one or more of the neighbor blocks from the previous (or above) row of blocks such as the top neighbor, top-left neighbor, top-right neighbor, and top-right-right neighbor blocks, as well as on the left neighbor, as shown in FIG. 3. In at least some embodiments of a block processing pipeline that implements the knight's order processing method, a buffer of sufficient size to cache the C most recently processed blocks on the current row group (e.g., quadrow) may be implemented at each of one or more stages of the pipeline. This buffer may be referred to as the current quadrow buffer, and may, for example, be implemented as a circular FIFO buffer. In at least some embodiments, C may be determined such that the buffer includes an entry corresponding to the top-left neighbor of the current block at the stage according to the algorithm for determining a next block and the row group size used to constrain the knight's order method. The buffer may also include entries corresponding the top-right-right, left, top-right, and top neighbors for the current block according to the algorithm.

However, for the blocks in the top row of a row group (e.g., a quadrow), information for neighbors in the row above is not in the current quadrow buffer. In at least some embodiments, to provide neighbor information for blocks on the top row of the current quadrow (e.g., top-left, top, top-right, and top-right-right neighbor information), a previous quadrow buffer may be implemented at each of one or more stages of the pipeline. When processing a quadrow, information for each block on the bottom row of the quadrow is written to a neighbor data structure in external memory, for example by a last stage of the pipeline. When processing blocks from the top row of a next quadrow, information for neighbor blocks in the bottom row of the previous quadrow is read from the external memory, for example by a first stage of the pipeline, and passed down the pipeline to other stages with the top row blocks. In at least some embodiments, information for the top-right-right neighbor block of a block in the top row is read from the external memory. In at least some embodiments, the previous quadrow buffer is a circular buffer, and an oldest entry in the previous quadrow buffer is replaced with the neighbor information that is read from the external memory. In various embodiments, the external memory to which blocks in the bottom row are written and from which neighbor block information is read may be a memory of the pipeline component that is external to the last stage, a memory of a video encoder that implements the pipeline, or a memory external to the video encoder. In some embodiments, however, the memory may be a local memory of the last stage of the pipeline. At least some embodiments may include an interlock mechanism to control the reads and writes to the external memory between rows to avoid overwriting the data in external memory.

Example Pipeline Units

FIGS. 11A through 11C are block diagrams of example pipeline processing units that may be used at the stages of a block processing pipeline that implements one or more of the block processing methods and apparatus as described herein, according to at least some embodiments. For example, one or more of pipeline units 5000A and/or 5000B as shown in FIGS. 11A and 11B may be used at each stage of the example block processing pipeline shown in FIG. 12. Note that FIGS. 11A through 11C are not intended to be limiting; a pipeline processing unit may include more or fewer components and features than those shown in the Figures.

As shown in FIG. 11A, a pipeline unit 5000A may include at least a memory 5010 and a unit core 5020. Unit core 5020 may be a component (e.g., a circuit) that is configured to perform a particular operation on or for a block, or a portion of a block, at a particular stage of the block processing pipeline. Memory 5010 may, for example, be a double-buffered memory that allows the unit core 5020 to read and process data for a block from the memory 5010 while data for a next block is being written to the memory 5010 from a previous pipeline unit.

As shown in FIG. 11B, a pipeline unit 5000B, in addition to a memory 5010 and unit core 5020 as shown in FIG. 11A, may also include a processor 5030. Processor 5030 may, for example, be a mobile or M-class processor. The processors 5030 in pipeline units 5000B of a block processing pipeline may, for example, be used to control the block processing pipeline at block boundaries. The processors 5030 in pipeline units 5000B may be configurable, for example with low-level firmware microcode, to allow flexibility in algorithms that are implemented by the block processing pipeline for various applications. In at least some embodiments, a processor 5030 of a pipeline unit 5000B in the pipeline may be configured to receive data from a processor 5030 of a previous (upstream) pipeline unit 5000B and send data to a processor 5030 of a subsequent (downstream) pipeline unit 5000B. In addition, a processor 5030 of a pipeline unit 5000B at a last stage of the pipeline may be configured to send feedback data to a processor 5030 of a pipeline unit 5000B at a first stage of the pipeline.

As shown in FIGS. 11A and 11B, a pipeline unit 5000A or 5000B may be configured to access external memory, for example according to direct memory access (DMA). In addition, a pipeline unit 5000A or 5000B may be configured to pass information back to one or more previous (upstream) stages of the pipeline and/or to receive information passed back from one or more subsequent (downstream) stages of the pipeline. In addition, a pipeline unit 5000A or 5000B may be configured to pass information forward to one or more subsequent (downstream) stages of the pipeline and/or to receive information passed forward from one or more previous (upstream) stages of the pipeline.

As shown in FIG. 11C, two or more units 5000A as shown in FIG. 11A may be grouped together and configured to perform an operation in the pipeline. A single processor 5030 may be used to control and/or configure the pipeline units 5000A.

Example Block Processing Pipeline

FIG. 12 is a high-level block diagram of general operations in an example block processing method 6000 for H.264 encoding that may be implemented in stages by a block processing pipeline 7040 that may implement one or more of the block processing methods and apparatus as described herein, according to at least some embodiments. A block processing pipeline 7040 that implements the block processing method 6000 may, for example, be implemented as a component of an H.264 video encoder apparatus that is configured to convert input video frames from an input format into H.264/Advanced Video Coding (AVC) format as described in the H.264/AVC standard. The H.264/AVC standard is published by ITU-T in a document titled "ITU-T Recommendation H.264: Advanced video coding for generic audiovisual services", which may be referred to as the H.264 Recommendation. An example input video format is 1080p (1920×1080 pixels, 2.1 megapixels) encoded in YCbCr color space. However, other input video formats may be encoded into H.264 using embodiments of the pipeline in a video encoder apparatus.

The video encoder apparatus may, for example, be implemented as an integrated circuit (IC) or as a subsystem on an IC such as a system-on-a-chip (SOC). In at least some embodiments, the video encoder apparatus may include at least a pipeline component, a processor component (e.g., a low-power multicore processor), and a bus subsystem or fabric that interconnects the functional components of the apparatus. The processor component of the video encoder apparatus may, for example, perform frame-level control of the pipeline such as rate control, perform pipeline configuration, and interface with application software via a driver. The pipeline component may implement multiple processing stages each configured to perform a portion or all of one or more of the operations as shown in FIG. 12, each stage including one or more processing units. At least one of the processing units in the pipeline may include a processor component (e.g., an M-class processor) that may, for example, configure parameters of the processing unit at the respective stage at the macroblock level. The video encoder apparatus may include other functional components or units such as memory components, as well as external interfaces to, for example, one or more video input sources and external memory. Example video input sources to the video encoder apparatus may include one or more of, but are not limited to, a video camera for raw video input processing, a decoder apparatus for re-encoding/transcoding, a flash or other memory, and a JPEG decoder. An example video encoder apparatus is illustrated in FIG. 13. An example SOC that includes a video encoder apparatus is illustrated in FIG. 14. While embodiments are generally described in relation to hardware implementations of a block processing pipeline that implements the block processing method 6000 with knight's order processing, note that the block processing method 6000 with knight's order processing may be implemented by a block processing pipeline implemented in software.

A pipeline that implements the method 6000 as shown in FIG. 12 may process 16×16 pixel macroblocks from input video frames according to the H.264 standard, each macroblock including two or more blocks or partitions that may be processed separately at stages of the pipeline. The input video frames may, for example, be encoded in YCbCr color space; each macroblock may be composed of separate blocks of chroma and luma elements that may be processed separately at the stages of the pipeline. A pipeline that implements the block processing method 6000 may receive input macroblocks from and output processed macroblocks to a memory. The memory may include memory of the video encoder apparatus and/or memory external to the video encoder apparatus. In at least some embodiments, the memory may be accessed by the pipeline as necessary, for example via direct memory access (DMA). In at least some embodiments, the memory may be implemented as a multi-level memory with a cache memory implemented between the pipeline and an external memory. For example, in some implementations, one or more quadrows may be read from an external memory and cached to the cache memory for access by the pipeline to reduce the number of reads to an external memory.

The general operations of the example H.264 video encoder method 6000 as shown in FIG. 12 that may be performed in stages by a pipeline, as well as general data flow through the pipeline, are briefly described below. Each of the general operations of the method 6000 may be implemented by one or more pipeline units at one or more stages of the pipeline. Example pipeline units are illustrated in FIGS. 11A through 11C. Also note that each general operation shown in FIG. 12 may be subdivided into two or more operations that may be implemented by pipeline units at one, two, or more stages of the pipeline. However, two or more of the operations shown in FIG. 12 may be performed at the same stage of the pipeline. Each stage in the pipeline processes one macroblock at a time, and thus two or more of the operations may simultaneously operate on the same macroblock that is currently at the respective stage. Note that a pipeline may perform more, fewer, or other operations than those shown in FIG. 12 and described below.

Macroblock Input

In at least some embodiments, macroblock input 6002 may be performed by an initial stage of the pipeline. In at least some embodiments, macroblock input 6002 receives luma and chroma pixels from a memory, for example via DMA, computes statistics on input pixels that are used by firmware in downstream stages of the pipeline, and buffers input macroblocks to enable firmware look ahead. The input macroblock pixel data and corresponding statistics are buffered and sent to one or more downstream stages of the pipeline that implement intra-frame and inter-frame estimation 6010 operations. In at least some embodiments, an input buffer of up to 16 macroblocks is maintained for input pixels and statistics. In at least some embodiments, the macroblock pixel data and corresponding statistics may be input to downstream stages of the pipeline according to a knight's order input algorithm as previously described in the section titled Knight's order processing.

In at least some embodiments, macroblock input 6002 reads neighbor data from the bottom row of a previous quadrow from memory at quadrow boundaries and passes the neighbor data to at least one downstream stage.

Intra-Frame and Inter-Frame Estimation

Intra-frame and inter-frame estimation 6010 operations may determine blocks of previously encoded pixels to be used in encoding macroblocks input to the pipeline. In H.264 video encoding, each macroblock can be encoded using blocks of pixels that are already encoded within the current frame. The process of determining these blocks may be referred to as intra-frame estimation, or simply intra-estimation. However, macroblocks may also be encoded using blocks of pixels from one or more previously encoded frames (referred to as reference frames). The process of finding matching pixel blocks in reference frames may be referred to as inter-frame estimation, or more generally as motion estimation. Intra-frame and inter-frame estimation 6010 operations may be subdivided into two or more sub-operations that may be performed at one, two, or more stages of the pipeline, with one or more components or pipeline units at each stage configured to perform a particular sub-operation.

In at least some embodiments, macroblock input 6002 reads neighbor data from the bottom row of a previous quadrow from memory at quadrow boundaries and passes the neighbor data to intra-frame and inter-frame estimation 6010, for example to an intra-frame estimation component. In addition, motion compensation and reconstruction 6030, for example a luma reconstruction component, may pass neighbor data as feedback to intra-frame and inter-frame estimation 6010, for example to the intra-frame estimation component.

Motion Estimation

In at least some embodiments, to perform motion estimation, the pipeline may include one instance of a motion estimation engine for each reference frame to be searched. Each motion estimation engine searches only one reference frame. In at least some embodiments, each motion estimation engine may include a low resolution motion estimation component, a full pixel motion estimation component, and a subpixel motion estimation component. In at least some embodiments, the three components of each of the motion estimation engines may be implemented at different stages of the pipeline. In at least some embodiments, motion estimation is performed on luma reference data from one or more reference frames. In at least some embodiments, each motion estimation engine may also include a memory component that reads and locally stores reference frame data (e.g., luma reference data) from an external memory as needed. In at least some embodiments, a single instance of a processor manages all instances of the motion estimation engine. In at least some embodiments, the processor may determine one or more candidates using predicted and co-located motion vectors and input the candidates to the full pixel motion estimation components of the motion estimation engines.

In at least some embodiments, the low resolution motion estimation component of each motion estimation engine performs an exhaustive search on a scaled-down, low resolution version of a respective reference frame to generate candidates. In at least some embodiments, the full pixel motion estimation component performs a search on full size pixels using candidates from the low resolution motion estimation component. In at least some embodiments, the subpixel motion estimation component performs a search on half and quarter pixels using best candidates received from the full pixel motion estimation component. In some embodiments, full pixel motion estimation and subpixel motion estimation may be disabled based on results of a direct mode estimation performed at an upstream stage of the pipeline. In at least some embodiments, each motion estimation engine outputs results data to mode decision 6020.

In at least some embodiments, motion estimation may also include a direct mode estimation component that receives co-located and spatial motion vector data and computes a direct/skip mode cost, which it provides to mode decision 6020. Based on the results, the direct mode estimation component may disable full pixel motion estimation and subpixel motion estimation.

Intra Estimation

In at least some embodiments, an intra estimation component of the pipeline performs intra mode selection to determine blocks of pixels already encoded within the current frame that may be used in encoding a current macroblock. In at least some embodiments, the intra estimation component performs intra mode selection only for luma. In these embodiments, chroma intra estimation is performed by a chroma reconstruction component at a downstream stage of the pipeline. In at least some embodiments, the intra estimation component may perform intra estimation independently for each of two or more blocks or partitions (e.g., 4×4, 8×8, 4×8, 8×4, 16×8, and/or 8×16 blocks) in a macroblock. For each block, prediction pixels are first extracted from neighbor blocks (neighbor blocks can be outside the current macroblock in the frame or within the current macroblock). For each prediction mode in the current block, the cost of the current mode is evaluated by creating a prediction block from neighbor pixels, computing a mode cost, and comparing the mode cost to a minimum cost for that block. Once all prediction modes are evaluated and the best mode is determined, reconstruction may be performed for the best mode so that reconstructed pixels can be used to predict future blocks within the macroblock. The intra estimation component may pass best intra mode information to mode decision 6020.

In at least some embodiments, macroblock input 6002 reads neighbor data from the bottom row of a previous quadrow from memory at quadrow boundaries and passes the neighbor data to the intra estimation component. In at least some embodiments, at least one downstream stage (e.g., a luma reconstruction component at a downstream stage) may pass neighbor data back to the intra estimation component.

Mode Decision

In at least some embodiments, mode decision 6020 may be implemented by a mode decision component at a stage of the pipeline that is downstream of the stage(s) that implement intra-frame and inter-frame estimation 6010 operations. However, in some embodiments, mode decision 6020 operations may be subdivided into two or more sub-operations that may be performed at one, two, or more stages of the pipeline, with one or more components or pipeline units at each stage configured to perform a particular sub-operation. In at least some embodiments, the mode decision 6020 component receives the best intra mode from intra estimation, direct/skip mode cost from direct mode estimation, and motion vector candidates from the motion estimation engines. In at least some embodiments, the mode decision component computes additional costs for bi-directional modes and determines the best macroblock type, including macroblock partitions, sub-partitions, prediction direction and reference frame indices. In at least some embodiments, the mode decision 6020 component also performs all motion vector prediction. The motion vector prediction results may be used when estimating motion vector rate during mode decision. In at least some embodiments, the motion vector prediction results may also be fed back from the mode decision 6020 component to motion estimation, for example for use in direct mode estimation and motion vector rate estimation.

Motion Compensation and Reconstruction

In at least some embodiments, motion compensation and reconstruction 6030 operations may be subdivided into two or more sub-operations that may be performed at one, two, or more stages of the pipeline, with one or more components or pipeline units at each stage configured to perform a particular sub-operation. For example, in some embodiments, motion compensation and reconstruction 6030 may be subdivided into luma motion compensation and reconstruction and chroma motion compensation and reconstruction. In at least some embodiments, each of these sub-operations of motion compensation and reconstruction 6030 may be performed by one or more components or pipeline units at one or more stages of the pipeline.

Luma Motion Compensation and Reconstruction

In at least some embodiments, a luma motion compensation component of the pipeline receives the best mode and corresponding motion vectors from mode decision 6020. As previously noted, each motion estimation engine may include a memory component that reads and stores reference frame data from a memory. If the best mode is inter-predicted, the luma motion compensation component requests reference frame macroblocks from the motion estimation engine corresponding to the motion vectors. The motion estimation engine returns subpixel interpolated 4×4 or 8×8 blocks depending on the request size. The luma motion compensation component then combines the blocks into prediction macroblocks. The luma motion compensation component then applies a weighted prediction to the prediction macroblocks to create the final macroblock predictor that is then passed to the luma reconstruction component.

In at least some embodiments, a luma reconstruction component of the pipeline performs macroblock reconstruction for luma, including intra prediction (in at least some embodiments, the luma motion compensation component performs inter prediction), forward transform and quantization (FTQ), and inverse transform and quantization (ITQ).

In at least some embodiments, based on the best mode from mode decision 6020, either an inter prediction macroblock is passed from the luma motion compensation component or intra prediction is performed by the luma reconstruction component to generate a prediction block. In intra mode, the prediction is performed in block (scan) order since reconstructed pixels from neighbor blocks are needed for prediction of future blocks. The input block is subtracted from the prediction block to generate a residual block. This residual pixel data is transformed and quantized by an FTQ technique implemented by the luma reconstruction component. The coefficient data is sent to an ITQ technique implemented by the luma reconstruction component, and may also be sent downstream to CAVLC encoding. The ITQ technique generates a reconstructed residual pixel block. The prediction block is added to the residual block to generate the reconstructed block. Reconstructed pixels may be passed downstream to a deblocking filter. In at least some embodiments, reconstructed pixels may also be passed back to an intra-frame estimation component of intra-frame and inter-frame estimation 1410 for prediction of future blocks inside the current macroblock.

Chroma Motion Compensation and Reconstruction

In at least some embodiments, chroma reconstruction is performed in two stages. In the first stage, chroma reference blocks needed for inter prediction are read from memory based on input macroblock type, motion vectors, and reference frame index. In some embodiments, the chroma reference blocks needed for a given macroblock may be prefetched into a chroma cache one or more stages prior to the chroma motion compensation stage, for example at the luma motion compensation stage. Subpixel interpolation and weighted prediction is then applied to generate a prediction macroblock. In the second stage, chroma intra prediction and chroma intra/inter FTQ/ITQ is performed. This allows one additional pipeline stage to load chroma prediction pixel data. Since chroma pixels are not searched by motion estimation, the chroma prediction data is read from external memory and may have large latency. In at least some embodiments, a chroma motion compensation component performs the first stage, while a chroma reconstruction component performs the second stage.

In at least some embodiments, the chroma motion compensation component generates a prediction block including subpixel interpolation for Cb and Cr chroma blocks; the size is based on the partition size and chroma formats. A full size chroma block is 8×8, 8×16, or 16×16 pixels for chroma formats 4:2:0, 4:2:2 and 4:4:4, respectively. In at least some embodiments, the chroma motion compensation component may prefetch and cache chroma prediction pixels from an external (to the pipeline) memory. In at least some embodiments, reference data may be read based on mode decision 6020 results. The chroma motion compensation component performs subpixel interpolation to generate a prediction block. Mode decision 6020 provides the macroblock type and sub-types, reference frame index per partition, and corresponding motion vectors. The prediction is output to the chroma reconstruction component.

In at least some embodiments, the chroma reconstruction component performs chroma prediction, chroma intra estimation and chroma reconstruction for inter and intra modes. For chroma formats 4:2:0 and 4:2:2, intra chroma estimation and prediction is performed. In at least some embodiments, chroma intra estimation is performed at this stage rather than at intra-frame and inter-frame estimation 6010 so that reconstructed pixels can be used during the estimation process. In at least some embodiments, if the best mode is in intra, intra chroma estimation may be performed, based on the best intra chroma mode, and intra prediction may be performed using one of four intra chroma modes. For inter macroblocks, inter chroma prediction pixels are received from chroma motion compensation. For chroma format 4:4:4, the luma intra prediction modes are used to generate the chroma block prediction, and inter chroma prediction is performed in the same manner as for luma. Therefore, chroma reconstruction conceptually includes 4:2:0 and 4:2:2 chroma reconstruction and luma reconstruction used to reconstruct chroma in 4:4:4 chroma format.

CAVLC Encode and Deblocking

In at least some embodiments, CAVLC encoding and deblocking may be performed by one or more components at a last stage of the pipeline. In at least some embodiments, a deblocking filter component of the pipeline receives reconstructed luma and chroma pixels from the chroma reconstruction component and performs deblocking filtering according to the H.264 Recommendation. Results may be output to a memory.

In at least some embodiments, a CAVLC encode component of the pipeline receives at least luma and chroma quantized coefficients, neighbor data, and chroma reconstruction results from the chroma reconstruction component and generates a CAVLC (context-adaptive variable-length coding) encoded output stream to a memory.

In at least some embodiments, the deblocking filter component and the CAVLC encode component write neighbor data for the bottom row of a quadrow to a memory at quadrow boundaries. For the top row of a next quadrow, macroblock input 6002 may then read this neighbor data from the memory at quadrow boundaries and pass the neighbor data to at least one downstream stage of the pipeline.

Transcoder

In at least some embodiments, a transcoding operation may be performed by a transcoder 7050. The transcoder may be implemented as a functional component of the pipeline or as a functional component that is external to the pipeline. In at least some embodiments, the transcoder 7050 may perform a memory-to-memory transcoding or conversion of a CAVLC (context-adaptive variable-length coding) encoded stream output by the pipeline to a CABAC (context-adaptive binary arithmetic coding) encoded stream.

In at least some embodiments, the pipeline may encode in an order other than scan order, for example knight's order as previously described herein. However, ultimately, the H.264 video encoder's encoded bit stream should be transmitted in conventional macroblock scan order. In at least some embodiments, re-ordering the macroblock output from knight's order to scan order is accomplished by the CAVLC encode component writing encoded data to four different output buffers, each output buffer corresponding to a macroblock row. At the end of a quadrow, each row buffer will contain a scan order stream of encoded macroblocks for a respective row. Transcoder 7050 handles stitching the start and end of each row to generate a continuous stream at macroblock row boundaries. In at least some embodiments, the pipeline may embed metadata in the CAVLC output stream to facilitate stitching of the rows by the transcoder 7050.

Example Video Encoder Apparatus

FIG. 13 is a block diagram of an example video encoder apparatus 7000, according to at least some embodiments. The video encoder apparatus 7000 may, for example, be implemented as an integrated circuit (IC) or as a subsystem on an IC such as a system-on-a-chip (SOC). In at least some embodiments, the video encoder apparatus 7000 may include a pipeline 7040 component, a transcoder 7050 component, a processor 7010 component (e.g., a low-power multicore processor), a memory management unit (MMU) 7020, DMA 7030, and an interconnect 7080 such as a bus subsystem or fabric that interconnects the functional components of the apparatus. While shown as a functional component that is external to the pipeline 7040, in some embodiments transcoder 7050 may be implemented as a functional component of the pipeline 7040. The processor 7010 component of the video encoder apparatus 7000 may, for example, perform frame-level control of the pipeline 7040 such as rate control, perform pipeline 7040 configuration including configuration of individual pipeline units within the pipeline 7040, and interface with application software via a driver, for example for video encoder 7000 configuration. The MMU 7020 may serve as an interface to external memory, for example for streaming video input and/or output. Pipeline 7040 component may access memory through MMU 7020 via DMA 7030. In some embodiments, the video encoder apparatus 7000 may include other functional components or units not shown in FIG. 13, or fewer functional components than those shown in FIG. 13. An example block processing method that may be implemented by pipeline 7040 component is shown in FIG. 12. An example a system-on-a-chip (SOC) that may include at least one video encoder apparatus 7000 is illustrated in FIG. 14.

Example System on a Chip (SOC)

Turning now to FIG. 14, a block diagram of one embodiment of a system-on-a-chip (SOC) 8000 that may include at least one instance of a video encoder apparatus including a block processing pipeline that may implement one or more of the block processing methods and apparatus as illustrated in FIGS. 3 through 13. SOC 8000 is shown coupled to a memory 8800. As implied by the name, the components of the SOC 8000 may be integrated onto a single semiconductor substrate as an integrated circuit "chip." In some embodiments, the components may be implemented on two or more discrete chips in a system. However, the SOC 8000 will be used as an example herein. In the illustrated embodiment, the components of the SOC 8000 include a central processing unit (CPU) complex 8020, on-chip peripheral components 8040A-8040B (more briefly, "peripherals"), a memory controller (MC) 8030, a video encoder 7000 (which may itself be considered a peripheral component), and a communication fabric 8010. The components 8020, 8030, 8040A-8040B, and 7000 may all be coupled to the communication fabric 8010. The memory controller 8030 may be coupled to the memory 8800 during use, and the peripheral 8040B may be coupled to an external interface 8900 during use. In the illustrated embodiment, the CPU complex 8020 includes one or more processors (P) 8024 and a level two (L2) cache 8022.

The peripherals 8040A-8040B may be any set of additional hardware functionality included in the SOC 8000. For example, the peripherals 8040A-8040B may include video peripherals such as an image signal processor (ISP) configured to process image capture data from a camera or other image sensor, display controllers configured to display video data on one or more display devices, graphics processing units (GPUs), video encoder/decoders, scalers, rotators, blenders, etc. The peripherals may include audio peripherals such as microphones, speakers, interfaces to microphones and speakers, audio processors, digital signal processors, mixers, etc. The peripherals may include peripheral interface controllers for various interfaces 8900 external to the SOC 8000 (e.g. the peripheral 8040B) including interfaces such as Universal Serial Bus (USB), peripheral component interconnect (PCI) including PCI Express (PCIe), serial and parallel ports, etc. The peripherals may include networking peripherals such as media access controllers (MACs). Any set of hardware may be included.

More particularly in FIG. 14, SOC 8000 may include at least one instance of a video encoder 7000 component, for example a video encoder 7000 as illustrated in FIG. 13 that includes a block processing pipeline 7040 component that implements a block processing method 6000 and pipeline 7040 as illustrated in FIG. 12. Video encoder 7000 may, for example, be an H.264 video encoder apparatus that may be configured to convert input video frames from an input format into H.264/Advanced Video Coding (AVC) format as described in the H.264/AVC standard. The block processing pipeline 7040 may implement one or more of the block processing methods and apparatus as described herein in relation to FIGS. 3 through 12.

The CPU complex 8020 may include one or more CPU processors 8024 that serve as the CPU of the SOC 8000. The CPU of the system includes the processor(s) that execute the main control software of the system, such as an operating system. Generally, software executed by the CPU during use may control the other components of the system to realize the desired functionality of the system. The processors 8024 may also execute other software, such as application programs. The application programs may provide user functionality, and may rely on the operating system for lower level device control. Accordingly, the processors 8024 may also be referred to as application processors. The CPU complex 8020 may further include other hardware such as the L2 cache 8022 and/or and interface to the other components of the system (e.g. an interface to the communication fabric 8010). Generally, a processor may include any circuitry and/or microcode configured to execute instructions defined in an instruction set architecture implemented by the processor. The instructions and data operated on by the processors in response to executing the instructions may generally be stored in the memory 8800, although certain instructions may be defined for direct processor access to peripherals as well. Processors may encompass processor cores implemented on an integrated circuit with other components as a system on a chip (SOC 8000) or other levels of integration. Processors may further encompass discrete microprocessors, processor cores and/or microprocessors integrated into multichip module implementations, processors implemented as multiple integrated circuits, etc.

The memory controller 8030 may generally include the circuitry for receiving memory operations from the other components of the SOC 8000 and for accessing the memory 8800 to complete the memory operations. The memory controller 8030 may be configured to access any type of memory 8800. For example, the memory 8800 may be static random access memory (SRAM), dynamic RAM (DRAM) such as synchronous DRAM (SDRAM) including double data rate (DDR, DDR2, DDR3, etc.) DRAM. Low power/mobile versions of the DDR DRAM may be supported (e.g. LPDDR, mDDR, etc.). The memory controller 8030 may include queues for memory operations, for ordering (and potentially reordering) the operations and presenting the operations to the memory 8800. The memory controller 8030 may further include data buffers to store write data awaiting write to memory and read data awaiting return to the source of the memory operation. In some embodiments, the memory controller 8030 may include a memory cache to store recently accessed memory data. In SOC implementations, for example, the memory cache may reduce power consumption in the SOC by avoiding reaccess of data from the memory 8800 if it is expected to be accessed again soon. In some cases, the memory cache may also be referred to as a system cache, as opposed to private caches such as the L2 cache 8022 or caches in the processors 8024, which serve only certain components. Additionally, in some embodiments, a system cache need not be located within the memory controller 8030.

In an embodiment, the memory 8800 may be packaged with the SOC 8000 in a chip-on-chip or package-on-package configuration. A multichip module configuration of the SOC 8000 and the memory 8800 may be used as well. Such configurations may be relatively more secure (in terms of data observability) than transmissions to other components in the system. Accordingly, protected data may reside in the memory 8800 unencrypted, whereas the protected data may be encrypted for exchange between the SOC 8000 and external endpoints.

The communication fabric 8010 may be any communication interconnect and protocol for communicating among the components of the SOC 8000. The communication fabric 8010 may be bus-based, including shared bus configurations, cross bar configurations, and hierarchical buses with bridges. The communication fabric 8010 may also be packet-based, and may be hierarchical with bridges, cross bar, point-to-point, or other interconnects.

It is noted that the number of components of the SOC 8000 (and the number of subcomponents for those shown in FIG. 14, such as within the CPU complex 8020) may vary from embodiment to embodiment. There may be more or fewer of each component/subcomponent than the number shown in FIG. 14.

Example System

Figure 15:
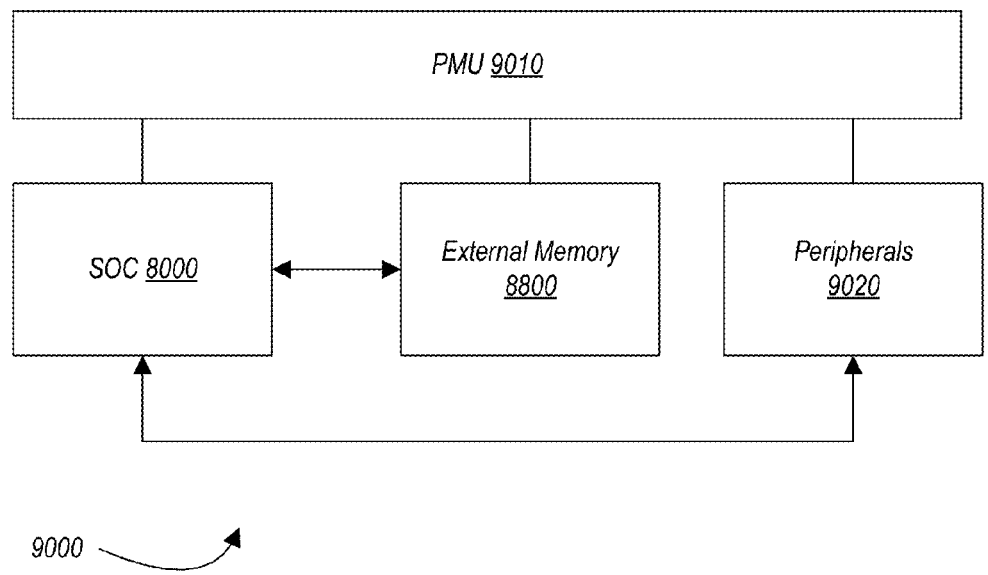
FIG. 15 is a block diagram of one embodiment of a system.

FIG. 15 a block diagram of one embodiment of a system 9000. In the illustrated embodiment, the system 9000 includes at least one instance of a SOC 8000 as illustrated in FIG. 14 coupled to one or more external peripherals 9020 and the external memory 8800. A power management unit (PMU) 9010 is provided which supplies the supply voltages to the SOC 8000 as well as one or more supply voltages to the memory 8800 and/or the peripherals 9020. In some embodiments, more than one instance of the SOC 8000 may be included (and more than one memory 8800 may be included as well).

The peripherals 9020 may include any desired circuitry, depending on the type of system 9000. For example, in one embodiment, the system 9000 may be a mobile device (e.g. personal digital assistant (PDA), smart phone, etc.) and the peripherals 9020 may include devices for various types of wireless communication, such as wifi, Bluetooth, cellular, global positioning system, etc. The peripherals 9020 may also include additional storage, including RAM storage, solid state storage, or disk storage. The peripherals 9020 may include user interface devices such as a display screen, including touch display screens or multitouch display screens, keyboard or other input devices, microphones, speakers, etc. In other embodiments, the system 9000 may be any type of computing system (e.g. desktop personal computer, laptop, workstation, net top etc.).

The external memory 8800 may include any type of memory. For example, the external memory 8800 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g. LPDDR, mDDR, etc.), etc. The external memory 8800 may include one or more memory modules to which the memory devices are mounted, such as single inline memory modules (SIMMs), dual inline memory modules (DIMMs), etc. Alternatively, the external memory 8800 may include one or more memory devices that are mounted on the SOC 8000 in a chip-on-chip or package-on-package implementation.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. An apparatus, comprising:
   a block processing pipeline comprising a plurality of stages each configured to perform one or more operations on blocks of pixels from input frames passing through the pipeline, wherein at least one of the plurality of stages is configured to access pixel data from one or more previously processed neighbor blocks on a row above a current block being processed to perform an operation on a rent block of pixels being processed at the stage;
   wherein the block processing pipeline is configured to:
      begin processing a frame in a first video stream from a first video source, wherein, to process the frame, blocks of pixels are read from the frame by a first stage of the pipeline and passed through the plurality of stages of the pipeline;
      receive, at the first stage of the block processing pipeline, an indication that a higher priority frame in a second video stream from a second video source needs to be processed;
      responsive to receipt of the indication, continue processing at least one pixel of the frame in the first video stream from the first video source until the first stage determines that a context stop location within the frame has been reached, wherein the context stop location is reached prior to completion of processing of the frame in the first video stream;
      perform a context stop for the frame from the first video source at the context stop location within the frame, wherein, in performing the context stop, a last row of processed blocks of the frame is stored to a buffer and an indication of the context stop location is propagated from the first stage through one or more downstream stages of the pipeline to notify the downstream stages that a context stop is being performed at the context stop location in the frame;
      process the higher priority frame from the second video source; and
      perform a context restart to resume processing of the frame from the first video source at within the frame, wherein, in performing the context restart, the last row of processed blocks of the frame is read from the buffer.

2. The apparatus as recited in claim 1, wherein the block processing pipeline is configured to process the blocks of pixels from the frame according to row groups each including two or more rows of blocks from the frame, and wherein the context stop location is at an end of a row group.

3. The apparatus as recited in claim 1, wherein the block processing pipeline is further configured to output processed blocks from the frame to a memory, and wherein the apparatus further comprises a transcoder engine configured to perform memory-to-memory transcoding of the processed blocks output by the block processing pipeline.

4. The apparatus as recited in claim 3, wherein said transcoding coverts a CAVLC (context-adaptive variable-length coding) encoded stream output by the block processing pipeline to a CABAC (context-adaptive binary arithmetic coding) encoded stream.

5. The apparatus as recited in claim 3, wherein a last stage of the block processing pipeline is further configured to propagate the context stop location to the transcoder engine via the processed blocks output to the memory.

6. The apparatus as recited in claim 3, wherein the block processing pipeline is further configured to insert a slice header in the processed blocks output to the memory to signal start of a new slice to the transcoder engine at the context stop location.

7. The apparatus as recited in claim 3, wherein the transcoder engine is configured to continue performing the memory-to-memory transcoding of the processed blocks from the frame output by the block processing pipeline while the block processing pipeline is processing blocks from the higher priority frame and outputting the processed blocks to the memory.

8. A method, comprising:
   inputting blocks of pixels from a current frame to a block processing pipeline comprising a plurality of stages, each stage configured to perform one or more operations on each block of pixels, wherein at least one stage is configured to access a previous row of processed blocks in performing operations on blocks in a current row of blocks being processed;
   receiving an indication of another frame to be processed in the block processing pipeline, wherein the other frame is a higher priority frame from a different video source than the current frame;
   in response to the indication, performing a context stop comprising:
      directing the block processing pipeline to stop processing the current frame at a context stop location after a current processing location and prior to an end of the current frame;
      determining that the block processing pipeline has stopped processing the current frame;
      storing a last row of processed blocks of the current frame to a buffer in response to the determination;
   in response to completion of the context stop, processing the other frame in the block processing pipeline;
   in response to completion of the processing, performing a context restart comprising:
      restoring the last row of processed blocks of the current frame from the buffer; and
      directing the block processing pipeline to resume processing of the current frame at the context stop location within the frame, wherein at least one stage accesses the restored last row of processed blocks in performing operations on a first row of input blocks after resuming processing of the current frame at the context stop location.

9. The method as recited in claim 8, wherein the block processing pipeline processes the blocks of pixels from the current frame according to row groups each including two or more rows of blocks from the current frame, and wherein the context stop location is at an end of a row group.

10. The method as recited in claim 8, further comprising:
outputting, by the block processing pipeline, processed blocks from the current frame to a memory; and
performing, by a transcoder engine, memory-to-memory transcoding of the processed blocks from the current frame output to the memory by the block processing pipeline.

11. The method as recited in claim 10, further comprising propagating the context stop location to the transcoder engine via the processed blocks from the current frame output to the memory.

12. The method as recited in claim 10, wherein the transcoder engine continues performing the memory-to-memory transcoding of the processed blocks from the current frame while the block processing pipeline is processing blocks from the other frame and outputting the processed blocks to the memory.

13. A device, comprising:
a memory; and
an apparatus comprising a block processing pipeline that includes a plurality of stages configured to process blocks of pixels passing through the pipeline and output the processed blocks to the memory, wherein at least one stage is configured to access a previous row of processed blocks in performing operations on blocks in a current row of blocks being processed, wherein the apparatus is configured to:
begin processing a current frame in the block processing pipeline;
receive an indication that another frame needs to be processed in the block processing pipeline;
direct the block processing pipeline to stop processing the current frame at a context stop location after a current processing location and prior to an end of the current frame;
store, to perform a context stop, a last row of processed blocks of the current frame to a buffer in response to a determination that the block processing pipeline has stopped processing the current frame;
in response to completion of the context stop, process the other frame in the block processing pipeline;
restore, to perform a context restore, the last row of processed blocks of the current frame from the buffer; and
direct the block processing pipeline to resume processing of the current frame at the context stop location within the frame, wherein at least one stage accesses the restored last row of processed blocks in performing operations on a first row of input blocks after resuming processing of the current frame at the context stop location;
wherein the current frame is from a first video source, wherein the other frame is from a higher priority video source than the first video source.

14. The device as recited in claim 13, wherein the block processing pipeline processes the blocks of pixels from the current frame according to row groups each including two or more rows of blocks from the current frame, and wherein the context stop location is at an end of a row group.

15. The device as recited in claim 13, wherein the apparatus further comprises a transcoder engine configured to read processed blocks from the current frame from the memory, convert the processed blocks to a different encoding, and output the converted blocks to the memory, and wherein the context stop location is propagated to the transcoder engine via the processed blocks from the current frame read from the memory.

16. The device as recited in claim 15, wherein the transcoder engine is further configured to:
stop reading processed blocks from the current frame at the context stop location; and
after said stop, read processed blocks from the other frame from the memory, convert the processed blocks to the different encoding, and output the converted blocks to the memory.

\* \* \* \* \*